US011419091B2

(12) United States Patent
Kumar et al.

(10) Patent No.: US 11,419,091 B2
(45) Date of Patent: Aug. 16, 2022

(54) POSITIONING ENHANCEMENTS IN 5G NR USING UPPER LAYER INDICATION

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/082,794

(22) Filed: Oct. 28, 2020

(65) Prior Publication Data
US 2021/0136721 A1 May 6, 2021

Related U.S. Application Data

(60) Provisional application No. 62/928,097, filed on Oct. 30, 2019.

(51) Int. Cl.
*H04W 64/00* (2009.01)
*H04W 4/90* (2018.01)
(Continued)

(52) U.S. Cl.
CPC ............ *H04W 64/006* (2013.01); *H04W 4/90* (2018.02); *H04W 76/15* (2018.02); *H04W 80/02* (2013.01)

(58) Field of Classification Search
CPC ............ H04W 72/042; H04W 72/0446; H04W 72/0453; H04W 76/27; H04W 88/06;
(Continued)

(56) References Cited

U.S. PATENT DOCUMENTS

2019/0053010 A1\* 2/2019 Edge ............... H04W 64/00
2019/0230475 A1 7/2019 Edge et al.
(Continued)

FOREIGN PATENT DOCUMENTS

WO WO-2020091932 5/2020

OTHER PUBLICATIONS

"3rd Generation Partnership Project, Technical Specification Group Core Network and Terminals, IP Multimedia Call Control Protocol Based on Session Initiation Protocol (SIP) and Session Description Protocol (SOP), Stage 3 (Release 16)", 3GPP Standard, Technical Specification, 3GPP TS 24.229, 3rd Generation Partnership Project (3GPP), Mobile Competence Centre, 650, Route Des Lucioles, F-06921 Sophia-Antipolis Cedex, France, vol. CT WG1, No. V16. 3.0, Sep. 24, 2019 (Sep. 24, 2019), pp. 1-1060, XP051784689, Retrieved from the Internet: URL: ftp://ftp.3gpp.org/Specs/archive/24_series/24.229/24229-g30.zip.24229-g30.doc [retrieved on Sep. 24, 2019] section u.2.2.6.5: EMC.
(Continued)

*Primary Examiner* — Kwasi Karikari
(74) *Attorney, Agent, or Firm* — Qualcomm Incorporated

(57) ABSTRACT

A user equipment (UE) enhances positioning performance using Evolved Universal Mobile Telecommunications System (UMTS) Terrestrial Radio Access Network (E-UTRAN) New Radio (NR)-Dual connectivity (EN-DC) based on an indication from the E-UTRAN base station that it is capable of EN-DC, e.g., in the upper layer indication of SIB2. When in idle mode, a UE that supports EN-DC and that has multiple carrier subscriptions may check the availability of EN-DC on both subscriptions that are camped on E-UTRAN base stations and use the subscription with EN-DC when a positioning session is initiated, e.g., from an emergency call. If one subscription is camped on a E-UTRAN base station and the other on an NR base station, the UE may use the
(Continued)

E-UTRAN base station if EN-DC is supported or may use the NR base station if EONR and location based services are supported. A list of E-UTRAN base stations capable of EN-DC may be generated and used for selections of base stations to connect to or to prioritize during a handover procedure.

24 Claims, 10 Drawing Sheets

(51) Int. Cl.
*H04W 80/02* (2009.01)
*H04W 76/15* (2018.01)
(58) Field of Classification Search
CPC ..... H04W 76/15; H04W 48/18; H04W 24/10; H04W 72/044; H04W 72/085; H04W 16/14; H04W 36/0069; H04W 76/19; H04W 76/20; H04W 28/0967; H04W 48/20; H04W 60/005; H04W 72/087; H04W 72/1231
See application file for complete search history.

(56) References Cited

U.S. PATENT DOCUMENTS

| | | | |
|---|---|---|---|
| 2020/0022200 A1* | 1/2020 | Lu | H04W 48/18 |
| 2020/0068414 A1* | 2/2020 | Karimli | H04J 3/0647 |
| 2021/0029776 A1* | 1/2021 | Tiwari | H04W 76/50 |

OTHER PUBLICATIONS

"3rd Generation Partnership Project, Technical Specification Group Radio Access Network, Evolved Universal Terrestrial Radio Access (E-UTRA), Radio Resource Control (RRC), Protocol specification (Release 15)", 3GPP Standard Technical Specification, 3GPP TS 36.331, RAN WG2, V15.7.0, Sep. 27, 2019, pp. 1-962, XP051785031, Retrieved from the Internet: URL: ftp://ftp.3gpp.org/Specs/archive/36_series/36.331/36331-f70.zip. 36331-f7O.docx.

"3rd Generation Partnership Project, Technical Specification Group Radio Access Network, Universal Terrestrial Radio Access (UTRA) and Evolved UTRA (E-UTRA) and Evolved Packet Core (EPC), User Equipment (UE) Conformance Specification for UE Positioning, Part 2: Protocol Conformance (Release 16)", 3GPP Standard, Technical Specification, 3GPP TS 37.571-2, 3rd Generation Partnership Project (3GPP), Mobile Competence Centre, 650, Route Des Lucioles, F-06921 Sophia-Antipolis Cedex, France, vol. RAN WG5, No. V16.2.0, Oct. 3, 2019, (Oct. 3, 2019), pp. 1-428, XP051785210, Retrieved from the Internet: URL: ftp://ftp.3gpp. org/Specs/archive/37_series/37.571-2/37571-2-g20.zip - 37571-2-g20.doc [retrieved on Oct. 3, 2019] sections 5.3, 6.1.1.1.3-6.1.1.1.4 and 6.1.1.3.

"3rd Generation Partnership Project, Technical Specification Group Services and System Aspects, IP Multimedia Subsystem (IMS) emergency sessions (Release 16)", 3GPP Standard, Technical Specification, 3GPP TS 23.167, 3rd Generation Partnership Project (3GPP), Mobile Competence Centre, 650, Route Des Lucioles, F-06921 Sophia-Antipolis Cedex, France, vol. SA WG2, No. V16. 0.0, Sep. 24, 2019 (Sep. 24, 2019), pp. 1-64, XP051784652, Retrieved from the Internet: URL: ftp://ftp.3gpp.org/Specs/archive/23_series/23.167/23167-g00.zip.23167-g00.doc[ retrieved on Sep. 24, 2019] tables H.1-H.2: EMS.

AT&T: "5G Icon Erroneously Displayed", 3GPP Draft, 3GPP TSG-RAN WG2 Meeting #107, R2-1908858, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 14, 2019 (Aug. 14, 2019), XP051766678, 5 Pages, Retrieved from the Internet: URL: http://www.3gpp.org/ftp/tsg_ran/WG2_RL2/TSGR2_107/Docs/R2-1908858.zip. [retrieved on Aug. 14, 2019] sections 1-3.

Huawei: et al., "NR Positioning Measurements", 3GPP Draft, 3GPP TSG RAN WG1 Meeting #98bis, R1-1910035, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808395, 19 Pages, Retrieved from the Internet: URL: https://ftp.3gpp.org/tsg_ran/WG1_RL1/TSGR1_98b/Docs/R1-1910035.zip. R1-1910035.docx. [retrieved on Oct. 5, 2019], sections 1. 2.1 and 3-5.1.

International Search Report and Written Opinion—PCT/US2020/058041—ISA/EPO—dated Feb. 22, 2021.

Qualcomm Incorporated: et al., "Introduction of NSSAI Efficient Signalling for IoT Devices", 3GPP Draft, 3GPP TSG-CT WG1 Meeting #120, C1-196910, 3rd Generation Partnership Project (3GPP), Mobile Competence Centre, 650, Route Des Lucioles, F-06921 Sophia-Antipolis Cedex, France, vol. CT WG1, No. Portoroz (Slovenia), Oct. 7, 2019-Oct. 11, 2019, Oct. 11, 2019, (Oct. 11, 2019), XP051800455, 43 Pages, Retrieved from the Internet: URL: https://ftp.3gpp.org/Meetings_3GPP_SYNC/CT1/updates/update7/C1-196910.zip. C1-196910.docx [retrieved on Oct. 11, 2019] section 5.5.1.2.4: Emergency services support indicator.

Sprint: "LTE UpperLayerIndication IE and Application to 5G Icon", 3GPP Draft, 3GPP TSG-RAN WG2 Meeting #107, R2-1910799, Upper Layer Indication and 5G Icon, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051768566, 6 Pages, Retrieved from the Internet: URL: http://www.3gpp.org/ftp/tsg_ran/WG2_RL2/TSGR2_107/Docs/R2-1910799.zip. [retrieved on Aug. 15, 2019] sections 1-3.

* cited by examiner

POSITIONING ENHANCEMENTS IN 5G NR USING UPPER LAYER INDICATION

CLAIM OF PRIORITY UNDER 35 U.S.C. § 119

This application claims under 35 USC § 119 the benefit of and priority to U.S. Provisional Application No. 62/928,097, filed Oct. 30, 2019, and entitled "POSITIONING ENHANCEMENTS IN 5G NR USING UPPER LAYER INDICATION," which is assigned to the assignee hereof and is incorporated herein by reference in its entirety.

BACKGROUND

Field of the Disclosure

Various aspects described herein generally relate to positioning systems, and more particularly, to positioning using an Evolved Universal Mobile Telecommunications System (UMTS) Terrestrial Radio Access Network (E-UTRAN) New Radio (NR)-Dual connectivity (EN-DC) enabled device.

Description of the Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

To meet the growing demands for expanded connectivity, wireless communication technologies or RATs are advancing from the LTE technology to a next generation new radio (NR) technology. For example, NR may provide lower latency and a higher bandwidth or throughput then LTE. One approach to providing the improved NR functionalities is to deploy an NR network within an LTE network. In other words, the NR network may be overlaid on top of the LTE network with overlapping coverage areas, where the NR network and the LTE network may operate over overlapping spectrums. Accordingly, co-existence and efficient resource utilization between LTE and NR may be important.

SUMMARY

A user equipment (UE) enhances positioning performance using Evolved Universal Mobile Telecommunications System (UMTS) Terrestrial Radio Access Network (E-UTRAN) New Radio (NR)-Dual connectivity (EN-DC) based on an indication from the E-UTRAN base station that it is capable of EN-DC, e.g., in the upper layer indication of SIB2. When in idle mode, a UE that supports EN-DC and that has multiple carrier subscriptions may check the availability of EN-DC on both subscriptions that are camped on E-UTRAN base stations and use the subscription with EN-DC when a positioning session is initiated, e.g., from an emergency call. If one subscription is camped on a E-UTRAN base station and the other on an NR base station, the UE may use the E-UTRAN base station if EN-DC is supported or may use the NR base station if EONR and location based services are supported. A list of E-UTRAN base stations capable of EN-DC may be generated and used for selections of base stations to connect to or to prioritize during a handover procedure.

In one implementation, a method for supporting location of a user equipment (UE) in a wireless network, the method performed by the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the method includes determining an E-UTRAN base station belonging to one of the multiple carrier subscriptions is capable of EN-DC while each of the carrier subscriptions is camped to E-UTRAN base stations and the UE is in idle mode; detecting initiation of a positioning session; connecting the UE to the wireless network using the E-UTRAN base station capable of EN-DC; and performing the positioning session through the wireless network using measured signals from at least the E-UTRAN base station and an NR base station.

In one implementation, a user equipment (UE) in a wireless network capable of supporting positioning of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE includes a wireless transceiver capable of communicating with E-UTRAN base stations and NR base stations; at least one memory; and at least one processor coupled to the wireless transceiver and the at least one memory, the at least one processor configured to: determine an E-UTRAN base station belonging to one of the multiple carrier subscriptions is capable of EN-DC while each of the carrier subscriptions is camped to E-UTRAN base stations and the UE is in idle mode; detect initiation of a positioning session; connect the UE via the wireless transceiver to the wireless network using the E-UTRAN base station capable of EN-DC; and perform the positioning session through the wireless network using measured signals from at least the E-UTRAN base station and an NR base station.

In one implementation, a user equipment (UE) in a wireless network capable of supporting location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE includes means for determining an E-UTRAN base station belonging to one of the multiple carrier subscriptions is capable of EN-DC while each of the carrier subscriptions is camped to E-UTRAN base stations and the UE is in idle mode; means for detecting initiation of a positioning session; means for connecting the UE to the wireless network using the E-UTRAN base station capable of EN-DC; and means for performing the positioning session through the wireless network using measured signals from at least the E-UTRAN base station and an NR base station.

In one implementation, a non-transitory storage medium including program code stored thereon, the program code is operable to configure at least one processor in a user equipment (UE) in a wireless network to support location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the non-transitory storage medium includes program code to determine an E-UTRAN base station belonging to one of the multiple carrier subscriptions is capable of EN-DC while each of the carrier subscriptions is camped to E-UTRAN base stations and the UE is in idle mode; program code to detect initiation of a positioning session; program code to connect the UE to the wireless network using the E-UTRAN base station capable of EN-DC; and program code to perform the positioning session through the wireless network using measured signals from at least the E-UTRAN base station and an NR base station.

In one implementation, a method for supporting location of a user equipment (UE) in a wireless network, the method performed by the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the method includes determining if a E-UTRAN base station belonging to a carrier subscription is capable of EN-DC while one carrier subscription is connected to the E-UTRAN base station and another carrier subscription is connected to an NR base station; using the E-UTRAN base station for location based services when the E-UTRAN base station is capable of EN-DC; and using the NR base station for location based services when the E-UTRAN base station is not capable of EN-DC and the NR base station supports location based services.

In one implementation, a user equipment (UE) in a wireless network capable of supporting positioning of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE includes a wireless transceiver capable of communicating with E-UTRAN base stations and NR base stations; at least one memory; and at least one processor coupled to the wireless transceiver and the at least one memory, the at least one processor configured to: determine if a E-UTRAN base station belonging to a carrier subscription is capable of EN-DC while one carrier subscription is connected to the E-UTRAN base station and another carrier subscription is connected to an NR base station; use the E-UTRAN base station for location based services when the E-UTRAN base station is capable of EN-DC; and use the NR base station for location based services when the E-UTRAN base station is not capable of EN-DC and the NR base station supports location based services.

In one implementation, a user equipment (UE) in a wireless network capable of supporting location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE includes means for determining if a E-UTRAN base station belonging to a carrier subscription is capable of EN-DC while one carrier subscription is connected to the E-UTRAN base station and another carrier subscription is connected to an NR base station; means for using the E-UTRAN base station for location based services when the E-UTRAN base station is capable of EN-DC; and means for using the NR base station for location based services when the E-UTRAN base station is not capable of EN-DC and the NR base station supports location based services.

In one implementation, a non-transitory storage medium including program code stored thereon, the program code is operable to configure at least one processor in a user equipment (UE) in a wireless network to support location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the non-transitory storage medium includes program code to determine if a E-UTRAN base station belonging to a carrier subscription is capable of EN-DC while one carrier subscription is connected to the E-UTRAN base station and another carrier subscription is connected to an NR base station; program code to use the E-UTRAN base station for location based services when the E-UTRAN base station is capable of EN-DC; and program code to use the NR base station for location based services when the E-UTRAN base station is not capable of EN-DC and the NR base station supports location based services.

In one implementation, a method for supporting location of a user equipment (UE) in a wireless network, the method performed by the UE, wherein the UE supports Evolved Universal Mobile Telecommunications System (UMTS) Terrestrial Radio Access Network (E-UTRAN) New Radio (NR)-Dual connectivity (EN-DC), the method includes determining for each E-UTRAN base station to which the UE connects whether the E-UTRAN base station is capable of EN-DC; storing a list of E-UTRAN base stations capable of EN-DC; connecting to an E-UTRAN base station that is not capable of EN-DC; detecting initiation of a positioning session; performing a handover procedure to connect to one of the E-UTRAN base stations from the list of E-UTRAN base stations capable of EN-DC; and performing the positioning session using the one of the E-UTRAN base stations and using measured signals from at least the connected E-UTRAN base stations and an NR base station.

In one implementation, a user equipment (UE) in a wireless network capable of supporting positioning of the UE, wherein the UE supports Evolved Universal Mobile Telecommunications System (UMTS) Terrestrial Radio Access Network (E-UTRAN) New Radio (NR)-Dual connectivity (EN-DC), the UE includes a wireless transceiver capable of communicating with E-UTRAN base stations and NR base stations; at least one memory; and at least one processor coupled to the wireless transceiver and the at least one memory, the at least one processor configured to: determine for each E-UTRAN base station to which the UE connects whether the E-UTRAN base station is capable of EN-DC; store a list of E-UTRAN base stations capable of EN-DC; connect to an E-UTRAN base station that is not capable of EN-DC; detect initiation of a positioning session; performing a handover procedure to connect via the wireless transceiver to one of the E-UTRAN base stations from the list of E-UTRAN base stations capable of EN-DC; and perform the positioning session using the one of the E-UTRAN base stations and using measured signals from at least the connected E-UTRAN base stations and an NR base station.

In one implementation, a user equipment (UE) in a wireless network capable of supporting location of the UE, wherein the UE supports Evolved Universal Mobile Telecommunications System (UMTS) Terrestrial Radio Access Network (E-UTRAN) New Radio (NR)-Dual connectivity (EN-DC), the UE includes means for determining for each E-UTRAN base station to which the UE connects whether the E-UTRAN base station is capable of EN-DC; means for storing a list of E-UTRAN base stations capable of EN-DC; means for connecting to an E-UTRAN base station that is not capable of EN-DC; means for detecting initiation of a positioning session; means for performing a handover procedure to connect to one of the E-UTRAN base stations from the list of E-UTRAN base stations capable of EN-DC; and means for performing the positioning session using the one of the E-UTRAN base stations and using measured signals from at least the connected E-UTRAN base stations and an NR base station.

In one implementation, a non-transitory storage medium including program code stored thereon, the program code is operable to configure at least one processor in a user equipment (UE) in a wireless network to support location of the UE, wherein the UE supports Evolved Universal Mobile Telecommunications System (UMTS) Terrestrial Radio Access Network (E-UTRAN) New Radio (NR)-Dual connectivity (EN-DC), the non-transitory storage medium includes program code to determine for each E-UTRAN base station to which the UE connects whether the E-UTRAN base station is capable of EN-DC; program code to store a list of E-UTRAN base stations capable of EN-DC; program code to connect to an E-UTRAN base station that is not capable of EN-DC; program code to detect initiation of a positioning session; program code to perform a handover procedure to connect to one of the E-UTRAN base stations from the list of E-UTRAN base stations capable of EN-DC; and program code to perform the positioning session using the one of the E-UTRAN base stations and using measured signals from at least the connected E-UTRAN base stations and an NR base station.

Like reference symbols in the various drawings indicate like elements, in accordance with certain example implementations. In addition, multiple instances of an element may be indicated by following a first number for the element with a letter or a hyphen and a second number. For example, multiple instances of an element 105 may be indicated as 105a, 105b. When referring to such an element using only the first number, any instance of the element is to be understood (e.g. element 105 in the previous example may refer to elements 105a and 105b.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G) operating in mmWave bands) network.

The present application describes mechanisms for positioning enhancements in 5G new radio (NR) using upper layer indication.

Figure 1:
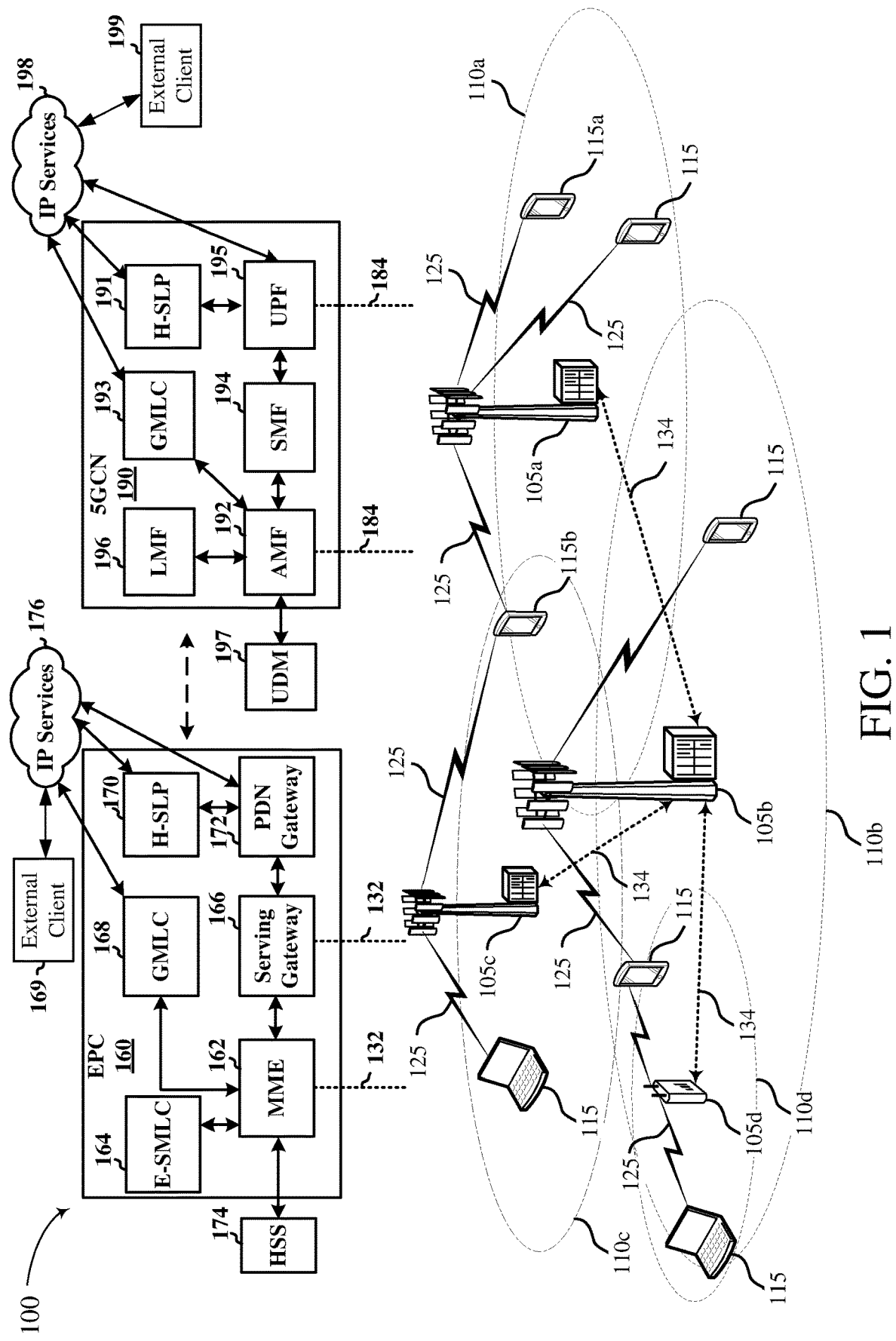
FIG. 1 is a diagram of an example wireless communications system to determine a position for a mobile device, according to embodiments of the present disclosure.

FIG. 1 illustrates a wireless communication network 100 capable of E-UTRAN New Radio-Dual connectivity (EN-DC), according to embodiments of the present disclosure. The network 100 includes base stations 105, UEs 115, and one or more core networks, illustrated as an Evolved Packet Core (EPC) 160 and a Fifth Generation Core (5GC) 190. While two core networks are shown the wireless communications system may use only one core network, e.g., the 5GC 190. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The base stations 105 may wirelessly communicate with the UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications network 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like. Each base station 105 may provide communication coverage for a respective geographic coverage area 110.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 115.

In 3GPP, the term "cell" can refer to this particular geographic coverage area of a base station and/or a base station subsystem serving the coverage area, depending on the context in which the term is used. In this regard, a base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. A base station for a femto cell may be referred to as a femto base station or a home base station. In the example shown in FIG. 1, the base stations 105a, 105b and 105c are examples of macro base stations for the coverage areas 110a, 110b and 110c, respectively. The base stations 105d is an example of a pico base station or a femto base station for the coverage area 110d. As will be recognized, a base station 105 may support one or multiple (e.g., two, three, four, and the like) cells.

Communication links 125 shown in the network 100 may include uplink (UL) transmissions from a UE 115 to a base station 105, or downlink (DL) transmissions, from a base station 105 to a UE 115. The UEs 115 may be dispersed throughout the network 100, and each UE 115 may be stationary or mobile.

A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a smart phone, a session initiation protocol (SIP) phone, a personal digital assistant (PDA), a satellite radio, a global positioning system, a multimedia device, a video device, a digital audio player (such as an MP3 player), a wireless modem, a wireless communication device, a camera, a game console, a handheld device, a tablet computer, a laptop computer, a cordless phone, a personal electronic device, a handheld device, a personal computer, a smart device, a wearable device, a wireless local loop (WLL) station, an Internet of things (IoT) device (such as a parking meter, gas pump, toaster, vehicles, heart monitor, an implant etc.), an Internet of Everything (IoE) device, a machine type communication (MTC) device, Industrial Internet of Things (IIoT) devices (such as sensors, instruments, and other devices networked together, in an industrial application) or the like.

The base stations 105 may communicate with the EPC 160 and/or 5GC 190 and with one another. The EPC 160 and/or 5GC 190 may provide user authentication, access authorization, tracking, Internet Protocol (IP) connectivity, and other access, routing, or mobility functions. At least some of the base stations 105 (e.g., which may be an example of an evolved NodeB (eNB), a next generation NodeB (gNB), or an access node controller (ANC)) may interface with their respective core networks through backhaul links (e.g., S1, S2, N2, Ne, etc.) and may perform radio configuration and scheduling for communication with the UEs 115. For example, eNB base stations 105 may interface with EPC 160 via backhaul links 132, while gNB base stations 105 may interface with 5GC 190 via backhaul links 184. In various examples, the base stations 105 may communicate, either directly or indirectly (e.g., through core network or intermediate base stations), with each other over backhaul links 134 (e.g., X1, X2, etc.), which may be wired or wireless communication links.

Each base station 105 may also communicate with a number of UEs 115 through a number of other base stations 105, where the base station 105 may be an example of a smart radio head. In alternative configurations, various functions of each base station 105 may be distributed across various base stations 105 (e.g., radio heads and access network controllers) or consolidated into a single base station 105.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 115 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 115 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198. The IP Services 198 may include the Internet, an intranet, an IP Multimedia Subsystem (IMS), a PS Streaming Service, and/or other IP services.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the base stations 105 can assign or schedule transmission resources (e.g., in the form of time-frequency resource blocks) for DL and UL transmissions in the network 100. DL refers to the transmission direction from a base station 105 to a UE 115, whereas UL refers to the transmission direction from a UE 115 to a base station 105. The communication can be in the form of radio frames. A radio frame may be divided into a plurality of subframes, for example, about 10. Each subframe can be divided into slots, for example, about 2. Each slot may be further divided into min-slots, as described in greater detail herein. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the base stations 105 and the UEs 115. For example, a reference signal can have a particular pilot pattern or structure, where pilot tones may span across an operational bandwidth or frequency band, each positioned at a pre-defined time and a pre-defined frequency. For example, a base station 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a base station 105 to estimate a UL channel. Control information may include resource assignments and protocol controls. Data may include protocol data and/or operational data. In some embodiments, the base stations 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a base station 105. The PSS may enable synchronization of period timing and may indicate a sector identity value (e.g., 0, 1, 2, etc.). The UE 115 may then receive a secondary synchronization signal (SSS). The SSS may enable radio frame synchronization, and may provide a cell identity value, which may be combined with the PSS identity value to identify the physical cell identity. The SSS may also enable detection of a duplexing mode and a cyclic prefix length. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more System Information Blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring and an upper layer indication of whether the cell is capable of E-UTRAN New Radio-Dual connectivity (EN-DC). After obtaining the MIB and/or the SIBs, the UE 115 can perform random access procedures to establish a connection with the base station 105. After establishing the connection, the UE 115 and the base station 105 can enter a normal operation stage, where operational data may be exchanged.

In some examples, wireless communications network 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network, e.g., EPC 160 and/or 5GC 190, supporting radio bearers for user plane data. At the Physical layer, transport channels may be mapped to physical channels.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

Devices of the wireless communications network 100 (for example, base stations 105 or UEs 115) may have a hardware configuration that supports communications over a particular carrier bandwidth, or may be configurable to support communications over one of a set of carrier bandwidths. In some examples, the wireless communications network 100 may include base stations 105 or UEs 115 that support simultaneous communications via carriers associated with more than one different carrier bandwidth.

Wireless communications network 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

As described herein, wireless communications network 100 may support LTE and NR and support communications between the one or more base stations 105 and supported UEs 115 using communication links 125. The UEs 115 may be dispersed throughout the wireless communications network 100, and each UE 115 may be stationary or mobile. Wireless communications network 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105, or as part of a mobility or beam management procedure for directional transmission associated with the enhanced channel resources.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

Aspects of wireless communications network 100 may include use of PRS transmissions by the base station 105 or sounding reference signal (SRS) transmissions by the UE 115 for UE location determination. For downlink-based UE location determination, a location server, e.g., an LMF 196 in a NR network 190 or a E-SMLC 164 or SLP 170 in an EPC network 160, may be used to provide positioning assistance, such as PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques. The location server 164/170/196 is illustrated in FIG. 1 as being located in core networks 160/190, but may be located elsewhere, e.g., within the RAN.

In some embodiments, the UEs 115 and the base stations 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the base station 105a and the UE 115a may be associated with one network operating entity, while the base station 105b and the UE 115b may be associated with another network operating entity. By time-partitioning the shared spectrum according to network operating entities, the communications between the base station 105a and the UE 115a and the communications between the base station 105b and the UE 115b may each occur during respective time periods and may avail themselves of an entirety of a designated shared spectrum.

In an embodiment, the network 100 may support multiple networks with different RAT technologies. For example, the network 100 may be initially deployed as an LTE network and subsequently add advanced RAT technologies such as NR to provide improved network functionalities, such as lower latency, greater bandwidth, and/or higher throughput. Mechanisms for deploying an NR network within an LTE network are described, for example, in 3GPP TS 37.340.

Figure 2:
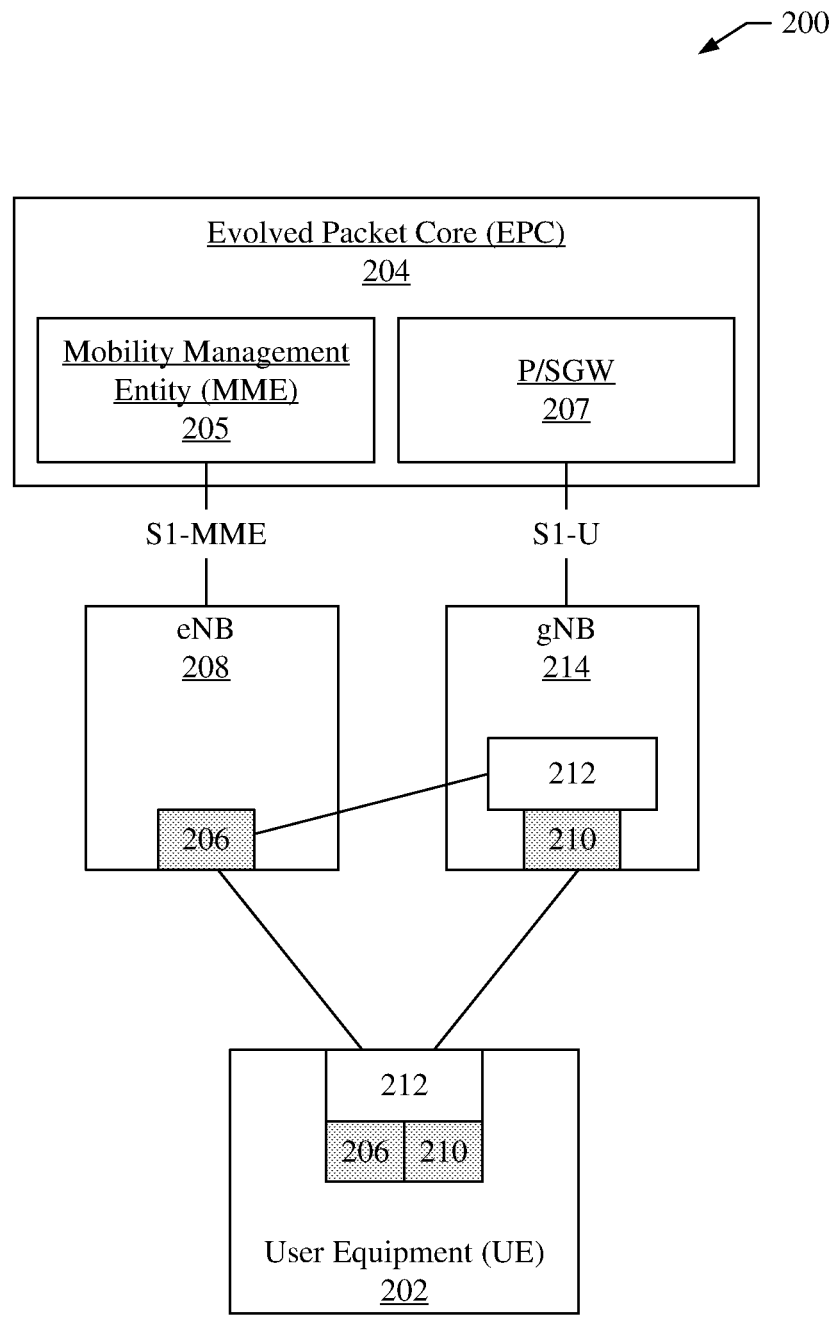
FIG. 2 illustrates a network system capable of E-UTRAN New Radio-Dual connectivity (EN-DC), according to embodiments of the present disclosure.

FIG. 2 illustrates a network system 200 capable of E-UTRAN New Radio-Dual connectivity (EN-DC), according to embodiments of the present disclosure. The network system 200 is capable of E-UTRAN (LTE) and NR (5G) multi-connectivity, sometimes referred to as Non-Standalone Architecture (NSA), as opposed to a standalone architecture (SA) that requires a 5G core network to be in place. The system 200 may correspond to a portion of the network 100 and include an LTE-NR tight interworking architecture with dual connectivity. The NR network may be unstable because it does not have ubiquitous coverage and has small cell radius. To overcome this problem, it may be desirable for a UE 115 to connect to both the LTE network and the NR network. In an embodiment, the NR network may be overlaid over the LTE network. The UE 202 supports dual connectivity, which allows the UE 202 to connect to both the LTE and NR network simultaneously. The UE 202 supports a non-standalone mode that utilizes the LTE network to support the connectivity of the UE 202 to the NR network. If the UE 202 is connected to the NR network, the UE 202 is also connected to the LTE network. The NR network may be a "best effort" network that is anchored in the LTE network. For example, if the UE 202 is within NR network coverage, the UE 202 will use the NR network to transmit data. In this example, the UE 202 harnesses the lower latency, greater bandwidth, and/or higher throughput offered by the NR network, while leveraging the stable links provided by the LTE network. If the connection to the NR network is not stable or is weak, the UE 202 may connect to the LTE network without connecting to the NR network.

The UE 202 may transmit data using an Evolved Packet Core (EPC) 204, which is the core network of the LTE system. The EPC 204 includes a Mobility Management Entity (MME) 205 and a P/SGW 207. The data traffic may be split. For example, the UE 202 may transmit LTE Radio Link Control (RLC)/Media Access Control (MAC) 206 to an eNB 208 and transmit NR RLC/MAC 210 and LTE/NR Packet Data Convergence Protocol (PDCP) 212 to the gNB 214. The eNB 208 and gNB 214 may communicate via a backhaul wireless or wireline connection. A split bearer may be located at the gNB 214, and the data sent to the eNB 208 will be merged at the gNB 214 with other data. The gNB 214 may aggregate the data and send it to the P/SGW 207 using the S1-U interface. Additionally, signaling information may pass through the eNB 208 to the MME 205 using the S1-MME interface. Although FIG. 2 illustrates an LTE-NR/EPC system, this is not intended to be limiting and other embodiments may include different systems. For example, in another embodiment, the system may include an LTE-NR/NGC system.

In some embodiments, the UE 202 may be in at most one state of a plurality of states. If the UE 202 is connected to a first network (e.g., NR network, 5G network, etc.) and a second network (e.g., LTE network, 4G network, etc.) simultaneously, the UE 202 is in a first connected mode. In this example, the UE 202 may be connected to both the NR network and the LTE network. The LTE network may be associated with an LTE cell, and the NR network may be associated with an NR cell. If the UE 202 is connected to the second network, but not the first network, the UE 202 is in a second connected mode. In this example, the UE 202 may be connected to the LTE network, but not to the NR network. If the UE 202 is idle, the UE 202 is in an idle mode connected to the second network, but not the first network. In this example, the UE 202 may be camped in the LTE network. The UE 202 may be in the idle mode if the UE 202 has no data to transmit or is not receiving data from another device.

If the UE 202 is in the second connected mode or the idle mode, however, the UE 202 may be unable to know whether the UE 202 is within coverage by the NR network or be able to receive the NR signal strength information. For example, if the UE 202 is in the idle mode, the UE 202 monitors the LTE network, not the NR network. If the UE 202 knows the frequency in which the NR network operates, the UE 202 may be able to determine whether the UE 202 is within coverage by the NR network. If the UE 202 knows the frequency, the UE 202 may tune to this frequency and transmit data.

An E-UTRAN, e.g., LTE, cell, may broadcast an indicator that indicates EN-DC capability to UEs. The indication may be provided in an information element in a system block information type 2 (SIB2). For example, the indication may be in a SIB2 field that provides indications to the upper layers, e.g., the upperLayerindication. A possible EN-DC capability indicator included as an upperLayerindication in SIB2 is shown in Table 1, which is based on a fragment of Abstract Syntax Notation One (ASN.1). The subscripts "-r15" may not be considered part of a parameter name and may be included only to indicate a 3GPP release in which a parameter was first defined (e.g. Release 15). Table 1 shows an indicator that provides an indication to the UE that the E-UTRAN cell is EN-DC capable.

TABLE 1

| | |
|---|---|
| PLMN-Info-r15 ::= | SEQUENCE { |
| upperLayerIndication-r15 | ENUMERATED {trueEN- |
| DC,spare} OPTIONAL | -- Need OR |
| } | |

The Information Element (IE) that provides an indication that an LTE cell is capable of EN-DC may be used to improve positioning performance of 4G-5G multimode UEs.

Figure 3:
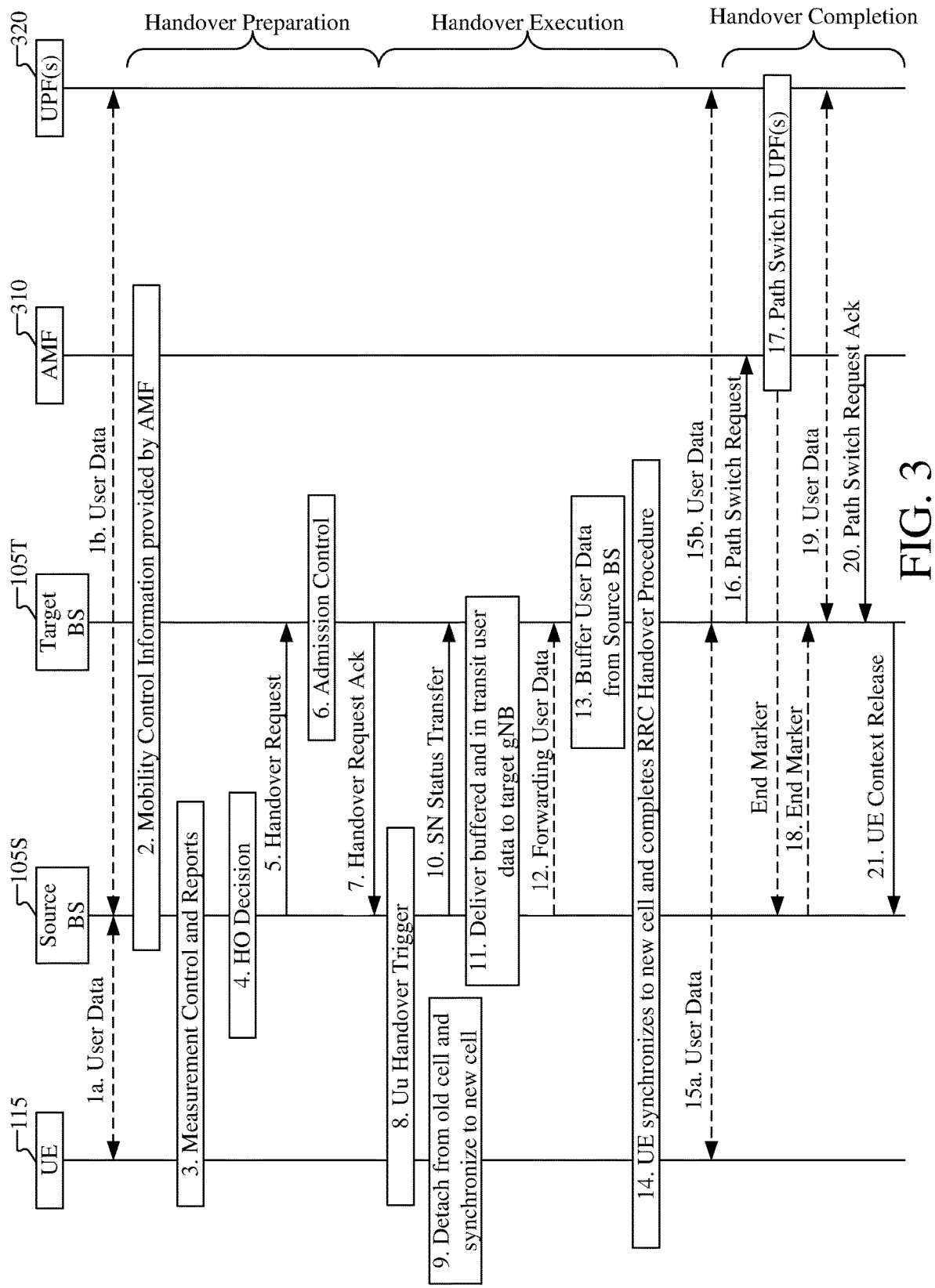
FIG. 3 illustrates a connection mode procedure for a user equipment (UE) between two base stations.

FIG. 3 illustrates a connection mode procedure for a UE 115 between a source base station 105S and a target base station 105T using network entities, such as an Access Management Function (AMF) 310 and a User Plane Function (UPF) 320, where neither network entity changes. One or more of the source base station 105S and target base station 105T may be, e.g., eNBs, gNBs, or other types of base stations. While FIG. 3 illustrates the network entities as 5G Core Network entities, e.g., AMF 310 and UPF 320, corresponding network entities from an LTE or LTE-A network may be used. The intra-RAN handover performs the preparation phase (stages 2-7) and execution phase (stages 8-14) of the handover procedure performed without involvement of the Core Network, i.e. preparation messages are directly exchanged between the base stations 105S and 105T. The release of the resources at the source base station during the handover completion phase (stages 16-21) is triggered by the target base station.

At stages 1a and 1b, user data may be sent between the UE 115 and source base station 105S and UPF 320.

At stage 2, mobility control information is provided to the source base station 105S and target base station 105T by the AMF 310. The mobility control information, for example, includes the UE context within the source base station 105S and contains information regarding roaming and access restrictions which were provided either at connection establishment or at the last Timing Advance (TA) update.

At stage 3, the source base station 105S configures the UE measurement procedures and the UE reports according to the measurement configuration.

At stage 4, the source base station 105S decides to handover the UE 115, e.g., based on Measurement Report and Radio Resource Management (RRM) information.

At stage 5, the source base station 105S issues a Handover Request message to the target base station 105T passing a transparent RRC container with necessary information to prepare the handover at the target side. The information may include at least the target cell ID, KBS* (a key derived by the UE 115 and source base station 105S when performing a horizontal or vertical key derivation), the Cell-Radio Network Temporary Identifier (C-RNTI) of the UE in the source base station 105S, RRM-configuration including UE inactive time, basic access stratum (AS)-configuration including antenna Info and DL Carrier Frequency, the current Quality of Service (QoS) flow to Dedicated Radio Bearer (DRB) mapping rules applied to the UE 115, the SIB1 from source base station 105S, the UE capabilities for different RATs, Protocol Data Unit (PDU) session related information, and can include the UE reported measurement information including beam-related information if available. The PDU session related information includes the slice information and QoS flow level QoS profile(s). After issuing a Handover Request, the source base station 105S may not reconfigure the UE 115, including performing Reflective QoS flow to DRB mapping.

At stage 6, Admission Control may be performed by the target base station 105T. Slice-aware admission control may be performed if the slice information is sent to the target base station 105T. If the PDU sessions are associated with non-supported slices the target base station 105T may reject such PDU Sessions.

At stage 7, the target base station 105T prepares the handover with L1/L2 and sends the HANDOVER REQUEST ACKNOWLEDGE to the source base station 105S, which includes a transparent container to be sent to the UE 115 as an RRC message to perform the handover.

At stage 8, the source base station 105S triggers the UE handover by sending an RRC Reconfiguration message to the UE, containing the information required to access the target cell: at least the target cell ID, the new C-RNTI, the target base station security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

At stage 9, the UE 115 detaches from the source base station 105S and begins synchronizing with the target base station 105T.

At stage 10, the source base station 105S sends the SN STATUS TRANSFER message to the target base station 105T.

At stage 11, the source base station 105S delivers to the target base station 105T buffered and in transit user data.

At stage 12, the source base station 105S forwards to the target base station 105T any user data that may be received by source base station 105S before the handover is complete.

At stage 13, the target base station 105T buffers user data received from the source base station 105S, e.g., in stages 11 and/or 12.

At stage 14, the UE 115 synchronizes to the target base station 105T and completes the RRC handover procedure by sending an RRC Reconfiguration Complete message to target base station 105T.

At stages 15a and 15b, user data may be sent between the UE 115 and target base station 105T and the target base station 105T may forward the user data to the UPF 320.

At stage 16, the target base station 105T sends a PATH SWITCH REQUEST message to AMF 310 to trigger the core network, e.g., 5GC, to switch the DL data path towards the target base station 105T and to establish, e.g., an NG interface instance towards the target base station 105T.

At stage 17, the core network switches the DL data path towards the target base station 105T. The UPF 320 sends one or more "end marker" packets on the old path to the source base station 105S per PDU session/tunnel and then can release any U-plane/transport network layer (TNL) resources towards the source base station 105S.

At stage 18, the source base station 105S sends the "end marker" packets to the target base station 105T.

At stage 19, user data for the UE 115 may be sent between the target base station 105T and the UPF 320.

At stage 20, the AMF 310 confirms the PATH SWITCH REQUEST message with the PATH SWITCH REQUEST ACKNOWLEDGE message.

At stage 21, upon reception of the PATH SWITCH REQUEST ACKNOWLEDGE message from the AMF 310, the target base station 105T sends the UE CONTEXT RELEASE to inform the source base station 105S about the success of the handover. The source base station 105S can then release radio and C-plane related resources associated to the UE context. Any ongoing data forwarding may continue.

Figure 4:
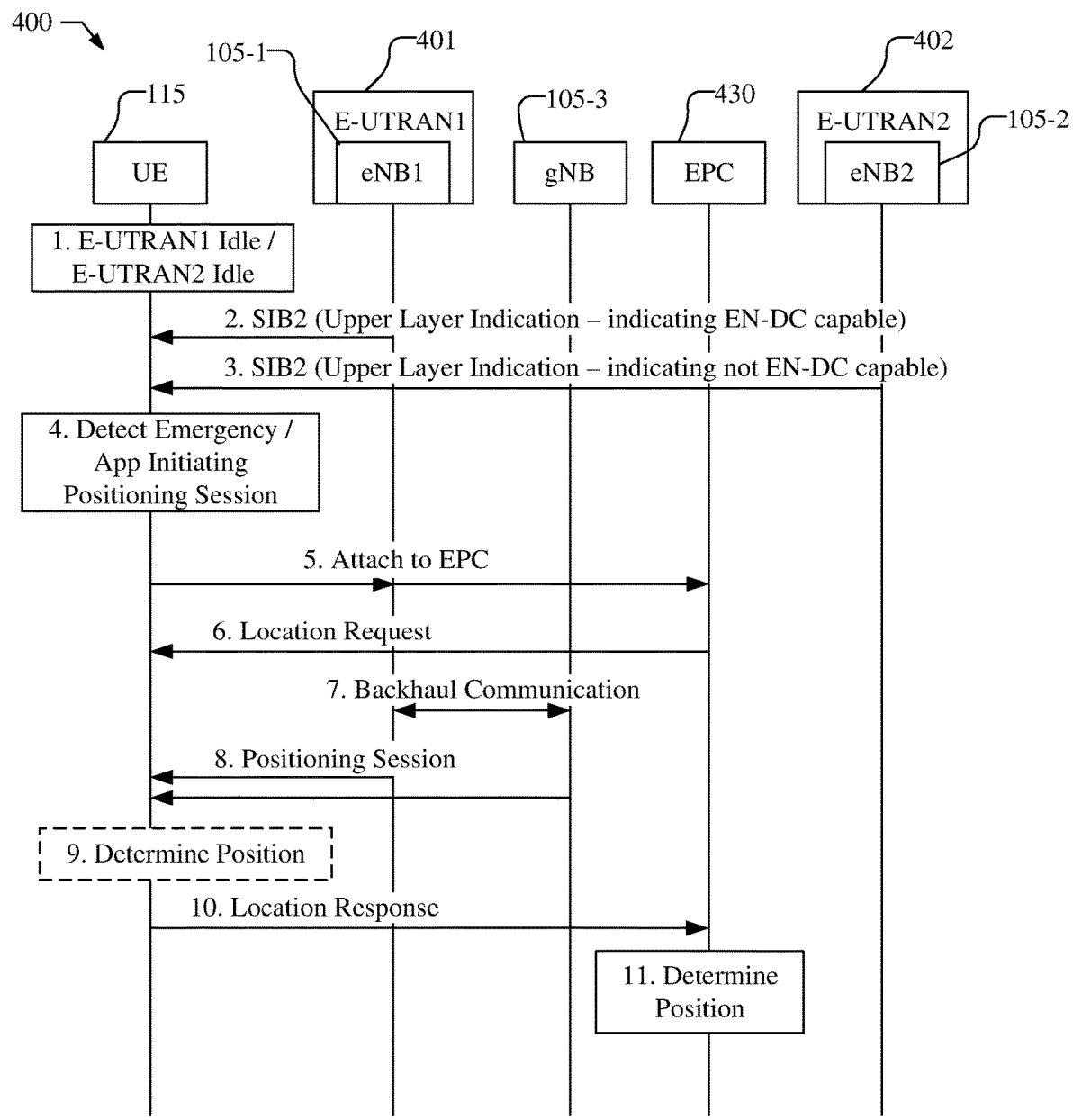
FIG. 4 shows an example message flow illustrating establishment of a positioning session for a that UE is capable of EN-DC.

FIG. 4 shows an example message flow 400 illustrating how various components of wireless communications system, such as wireless communications network 100 discussed with reference to FIG. 1 or network system 200 discussed with reference to FIG. 2, can establish a positioning session for a UE 115 that is capable of EN-DC. As mentioned previously, techniques disclosed herein are not necessarily limited to the architecture illustrated in FIGS. 1 and 2.

At stage 1, the UE 115 has multiple carrier subscriptions, e.g., with networks E-UTRAN1 401 and E-TRAN2 402, and is capable of EN-DC. The UE 115 may be camped on the two E-UTRAN networks 401 and 402, but is in idle mode for both networks, i.e., the UE 115 is not in active traffic for either network.

At stage 2, the eNB1 105-1 from the first network E-UTRAN1 401 broadcasts an indicator that is received by the UE 115 that indicates that the eNB1 105-1 is capable of EN-DC. For example, indication may be provided in an information element, e.g., upper layer indication, of SIB2.

At stage 3, the eNB2 105-2 from the second network E-UTRAN2 402 broadcasts an indicator that is received by the UE 115 that indicates that the eNB2 105-2 is not capable of EN-DC. The indication may be provided in an information element, e.g., upper layer indication, of SIB2.

At stage 4, the UE 115 may detect an emergency call or an application that initiates a positioning session.

At stage 5, the UE 115 may connect to a core network, EPC 430, and the eNB1 105-1 for the first E-UTRAN1 401, because the eNB1 105-1 is capable of EN-DC.

At stage 6, a location request is sent to the UE 115 from the EPC 430.

At stage 7, a backhaul communication between the eNB1 105-1 and a gNB 105-3 is established.

At stage 8, a positioning session is established and reference signals between the UE 115 and the eNB1 105-1 and gNB 105-3 (and other base stations not shown) are transmitted and received. For example, reference signals such as DL PRS, UL PRS (e.g., SRS), or DL PRS and UL PRS signals may be used. Positioning measurements of the reference signals provided by the base stations eNB1 105-1 and gNB 105-3 are made by the UE 115. Positioning measurements may be, e.g., Time Difference of Arrival (TDOA), Round Trip Time (RTT), Angle of Arrival (AoA), and Angle of Departure (AoD), etc. Positioning measurements of reference signals provided by UE 115 may also be made by the base stations eNB1 105-1 and gNB 105-3.

At optional stage 9, the UE 115 may determine the position of the UE 115, e.g., in a UE based positioning procedure.

At stage 10, a location response is provided by the UE 115 to the EPC 430. The location response, for example, may be the positioning measurements made by the UE 115 at stage 8 (the positioning measurements made by the base stations eNB1 105-1 and gNB 105-3 may also be provided separately). The location response may additionally or alternatively include the estimated position for the UE 115 from stage 9, e.g., in a UE based positioning procedure.

At stage 11, the position of the UE 115 may be determined or confirmed, e.g., by a location server in the EPC 430 using the location information received at stage 10, and positioning measurements from base stations if provided.

Figure 5A:
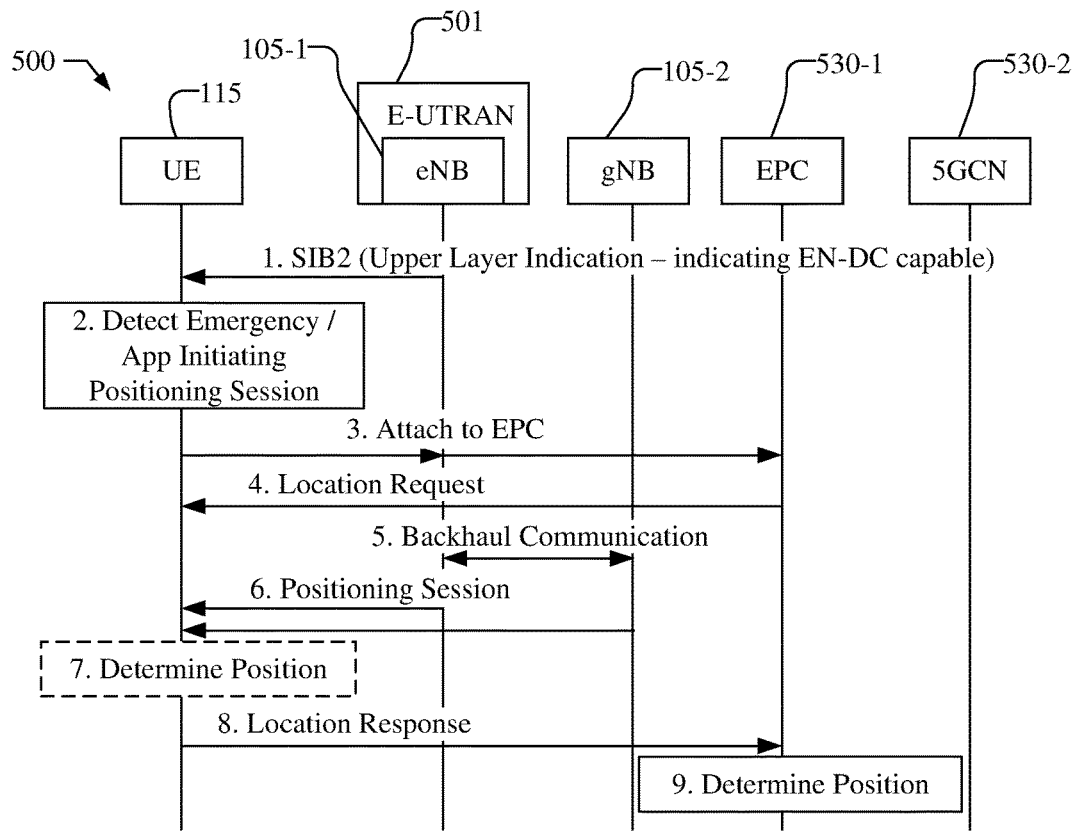
FIG. 5A shows another example message flow illustrating establishment of a positioning session for a UE that is capable of EN-DC.

FIG. 5A shows another example message flow 500 illustrating how various components of wireless communications system, such as wireless communications network 100 discussed with reference to FIG. 1 or network system 200 discussed with reference to FIG. 2, can establish a positioning session for a UE 115 that is capable of EN-DC. As mentioned previously, techniques disclosed herein are not necessarily limited to the architecture illustrated in FIGS. 1 and 2.

At stage 1, the eNB 105-1 from an E-UTRAN network 501 broadcasts an indicator that is received by the UE 115 that indicates that the eNB 105-1 is capable of EN-DC. For example, indication may be provided in an information element, e.g., upper layer indication, of SIB2. The UE 115 may be, for example, connected to eNB 105-1 via one carrier subscription, and connected to gNB 105-2 via another carrier subscription.

At stage 2, the UE 115 may detect an emergency call or an application that initiates a positioning session.

At stage 3, the UE 115 may connect to a core network, e.g., EPC 530-1, supported by the E-UTRAN 501 through the eNB 105-1, because the eNB 105-1 is capable of EN-DC.

At stage 4, a location request is sent to the UE 115 from the EPC 530-1.

At stage 5, a backhaul communication between the eNB 105-1 and a gNB 105-2 is established.

At stage 6, a positioning session is established and reference signals between the UE 115 and the eNB 105-1 and gNB 105-2 (and other base stations not shown) are transmitted and received. For example, reference signals such as DL PRS, UL PRS (e.g., SRS), or DL PRS and UL PRS signals may be used. Positioning measurements of the reference signals provided by the base stations eNB 105-1 and gNB 105-2 are made by the UE 115. Positioning measurements may be, e.g., TDOA, RTT, AoA, AoD, etc. Positioning measurements of reference signals provided by UE 115 may also be made by the base stations eNB 105-1 and gNB 105-2.

At optional stage 7, the UE 115 may determine the position of the UE 115, e.g., in a UE based positioning procedure.

At stage 8, a location response is provided by the UE 115 to the EPC 530-1. The location response, for example, may be the positioning measurements made by the UE 115 (the positioning measurements made by the base stations eNB 105-1 and gNB 105-2 may also be provided separately). The location response may additionally or alternatively include the estimated position for the UE 115 from stage 7, e.g., in a UE based positioning procedure.

At stage 9, the position of the UE 115 may be determined or confirmed, e.g., by a location server in the EPC 530-1 using the location information received at stage 8, and positioning measurements from base stations if provided.

Figure 5B:
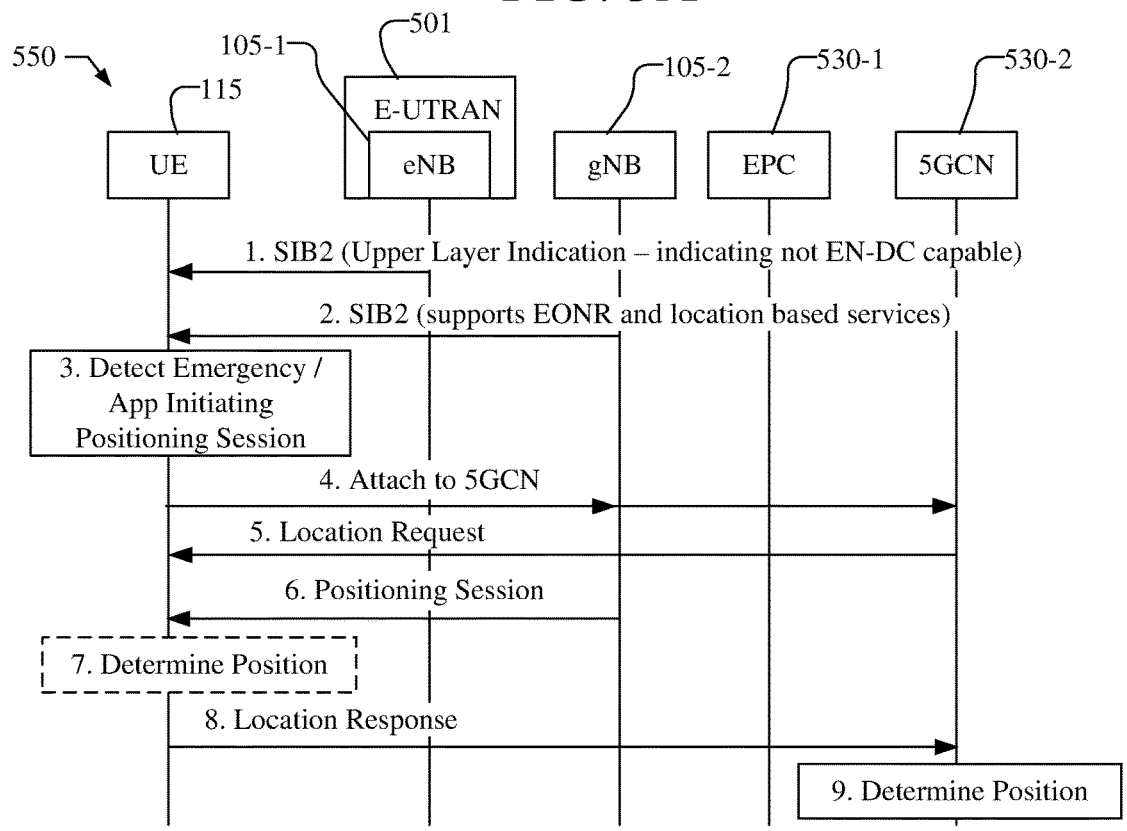
FIG. 5B shows another example message flow illustrating establishment of a positioning session for a UE that is capable of EN-DC.

FIG. 5B shows another example message flow 550 illustrating how various components of wireless communications system, such as wireless communications network 100 discussed with reference to FIG. 1 or network system 200 discussed with reference to FIG. 2, can establish a positioning session for a UE 115 that is capable of EN-DC. As mentioned previously, techniques disclosed herein are not necessarily limited to the architecture illustrated in FIGS. 1 and 2.

At stage 1, the eNB 105-1 from an E-UTRAN network 501 broadcasts an indicator that is received by the UE 115 that indicates that the eNB 105-1 is not capable of EN-DC. For example, indication may be provided in an information element, e.g., upper layer indication, of SIB2. The UE 115 may be, for example, connected to eNB 105-1 via one carrier subscription, and connected to gNB 105-2 via another carrier subscription.

At stage 2, the gNB 105-2 broadcasts an indicator that is received by the UE 115 that indicates that the gNB 105-2 supports Emergency Over NR (EONR) and/or location based services. For example, indication may be provided in an information element, e.g., upper layer indication, of SIB2.

At stage 3, the UE 115 may detect an emergency call or an application that initiates a positioning session.

At stage 4, the UE 115 may connect to a 5G core network, e.g., 5GCN 530-2 through the gNB 105-2, because the eNB 105-1 is not capable of EN-DC and the gNB 105-2 is capable of location based services and/or EONR.

At stage 5, a location request is sent to the UE 115 from the 5GCN 530-2.

At stage 6, a positioning session is established and reference signals between the UE 115 and the gNB 105-2 (and other base stations not shown) are transmitted and received. For example, reference signals such as DL PRS, UL PRS (e.g., SRS), or DL PRS and UL PRS signals may be used. Positioning measurements of the reference signals provided by gNB 105-2 are made by the UE 115. Positioning measurements may be, e.g., TDOA, RTT, AoA, AoD, etc. Positioning measurements of reference signals provided by UE 115 may also be made by gNB 105-2.

At optional stage 7, the UE 115 may determine the position of the UE 115, e.g., in a UE based positioning procedure.

At stage 8, a location response is provided by the UE 115 to the 5GCN 530-2. The location response, for example, may be the positioning measurements made by the UE 115 (the positioning measurements made by the gNB 105-2 may also be provided separately). The location response may additionally or alternatively include the estimated position for the UE 115 from stage 7, e.g., in a UE based positioning procedure.

At stage 9, the position of the UE 115 may be determined or confirmed, e.g., by a location server in the 5GCN 530-2 using the location information received at stage 8, and positioning measurements from base stations if provided.

Figure 6:
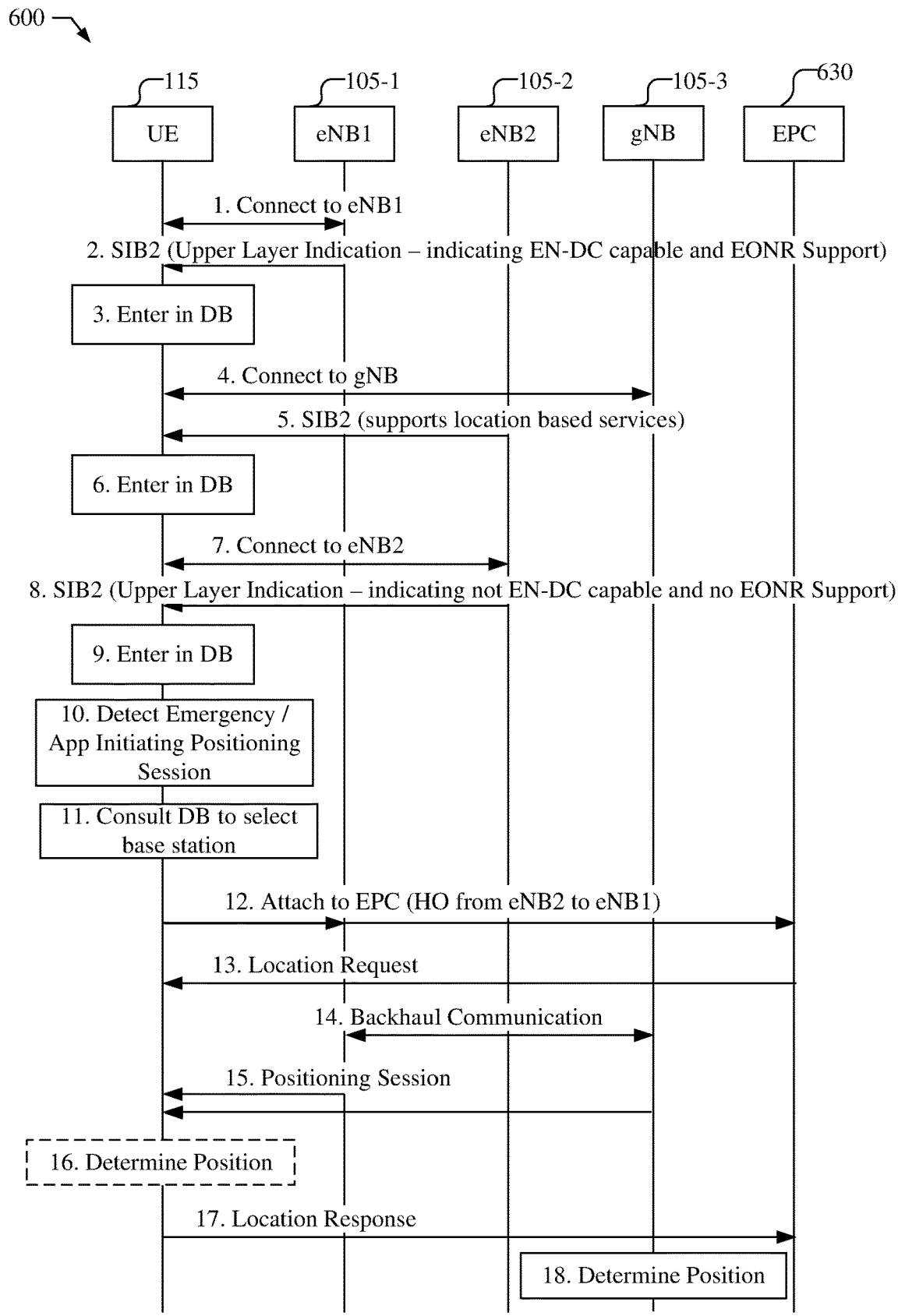
FIG. 6 shows another example message flow illustrating establishment of a positioning session for a UE that is capable of EN-DC.

FIG. 6 shows another example message flow 600 illustrating how various components of wireless communications system, such as wireless communications network 100 discussed with reference to FIG. 1 or network system 200 discussed with reference to FIG. 2, can establish a positioning session for a UE 115 that is capable of EN-DC. As mentioned previously, techniques disclosed herein are not necessarily limited to the architecture illustrated in FIGS. 1 and 2.

At stage 1, the UE 115 may connect to an E-UTRAN base station, eNB1 105-1.

At stage 2, the eNB1 105-1 broadcasts an indicator that is received by the UE 115 that indicates that the eNB1 105-1 is capable of EN-DC. For example, indication may be provided in an information element, e.g., upper layer indication, of SIB2. The eNB1 105-1 may further indicates that the eNB1 105-1 supports Emergency Call Over NR (EONR), which may be provided in an attach accept message.

At stage 3, the UE 115 may enter eNB1 105-1 in a database indicating that the eNB1 105-1 is capable of EN-DC and that the eNB1 105-1 supports EONR.

At stage 4, the UE 115 may connect to a 5G base station, gNB 105-3.

At stage 5, the gNB 105-3 broadcasts an indicator that is received by the UE 115 that indicates that the gNB 105-3 supports location based services. For example, the indication may be provided in an information element, e.g., upper layer indication, of SIB2.

At stage 6, the UE 115 may enter gNB1 105-3 in the database indicating that the gNB 105-3 supports location based services.

At stage 7, the UE 115 may connect to another E-UTRAN base station, eNB2 105-2.

At stage 8, the eNB2 105-2 broadcasts an indicator that is received by the UE 115 that indicates that the eNB2 105-2 is not capable of EN-DC. For example, indication may be provided in an information element, e.g., upper layer indication, of SIB2. The eNB2 105-2 may further indicates that the eNB2 105-2 does not support EONR.

At stage 9, the UE 115 may enter eNB2 105-2 in the database indicating that the eNB-2 105-2 is not capable of EN-DC and does not support EONR.

At stage 10, the UE 115 may detect an emergency call or an application that initiates a positioning session.

At stage 11, the UE 115 consults the database to select a base station for the positioning session, e.g., giving priority to base stations that support EN-DC.

At stage 12, a handover procedure is performed to switch the UE 115 from eNB2 150-2, which does not support EN-DC, to a connection with the EPC 630 through eNB1 150-1, which supports EN-DC and supports EONR, e.g., if the positioning session is for an emergency call.

At stage 13, a location request is sent to the UE 115 from the EPC 630.

At stage 14, a backhaul communication between the eNB1 105-1 and a gNB 105-3 is established.

At stage 15, a positioning session is established and reference signals between the UE 115 and the eNB1 105-1 and gNB 105-3 (and other base stations not shown) are transmitted and received. For example, reference signals such as DL PRS, UL PRS (e.g., SRS), or DL PRS and UL PRS signals may be used. Positioning measurements of the reference signals provided by the base stations eNB1 105-1 and gNB 105-3 are made by the UE 115. Positioning measurements may be, e.g., TDOA, RTT, AoA, AoD, etc. Positioning measurements of reference signals provided by UE 115 may also be made by the base stations eNB1 105-1 and gNB 105-3.

At optional stage 16, the UE 115 may determine the position of the UE 115, e.g., in a UE based positioning procedure.

At stage 17, a location response is provided by the UE 115 to the EPC 630. The location response, for example, may be the positioning measurements made by the UE 115 (the positioning measurements made by the base stations eNB1 105-1 and gNB 105-3 may also be provided separately). The location response may additionally or alternatively include the estimated position for the UE 115 from stage 16, e.g., in a UE based positioning procedure.

At stage 18, the position of the UE 115 may be determined or confirmed, e.g., by a location server in the EPC 530 using the location information received at stage 17, and positioning measurements from base stations if provided.

Figure 7:
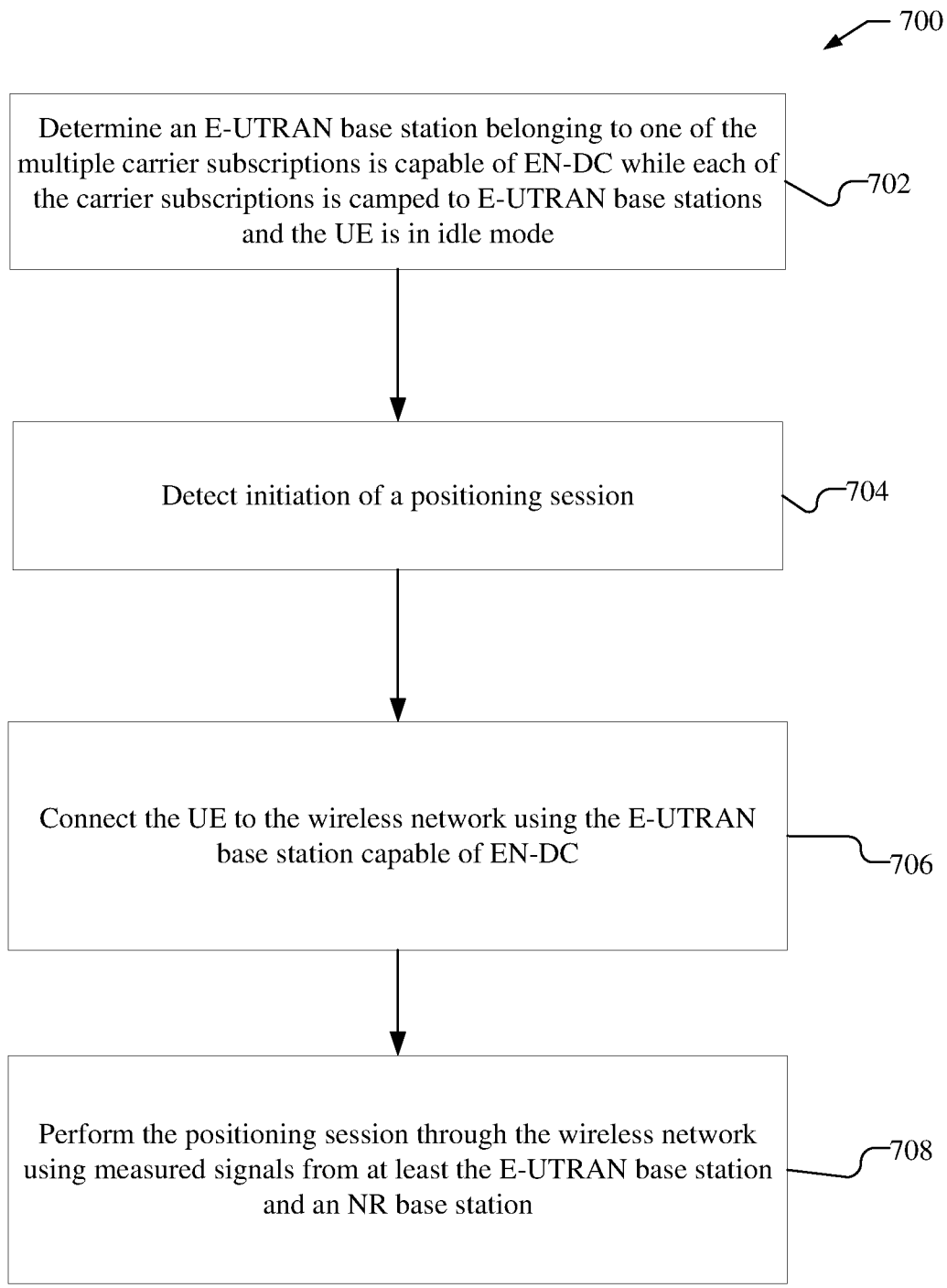
FIG. 7 shows a flowchart of an example procedure for supporting location of a UE.

FIG. 7 shows a flowchart of an example procedure 700 for supporting location of a user equipment (UE) such as the UE 115 in FIGS. 1 and 2, performed by the UE. The UE has multiple carrier subscriptions and supports Evolved Universal Mobile Telecommunications System (UMTS) Terrestrial Radio Access Network (E-UTRAN) New Radio (NR)-Dual connectivity (EN-DC).

As illustrated, at block 702, an E-UTRAN base station belonging to one of the multiple carrier subscriptions is determined to be capable of EN-DC while each of the carrier subscriptions is camped to E-UTRAN base stations and the UE is in idle mode, for example, as illustrated at stages 1, 2, and 3 of FIG. 4. For example, both carrier subscriptions may be camped to LTE and the UE is in LTE(Idle)+LTE(Idle) mode, i.e., the UE may be in dual SIM mode and may monitor both networks, but not be in active traffic of either network. For example, the base station belonging to the carrier subscription may be determined to be capable of EN-DC by detecting an indication that the base station belonging to the carrier subscription is capable of EN-DC in a system block information type 2 (SIB2) information field. For example, the SIB2 information field is an upper layer indication information element.

At block 704, initiation of a positioning session may be detected, e.g., as illustrated at stage 4 of FIG. 4. For example, detecting the initiation of the positioning session may comprise detecting an emergency call or an application that initiates the positioning session, e.g., as illustrated at stage 4 of FIG. 4.

At block 706, the UE connects to the wireless network using the E-UTRAN base station capable of EN-DC, e.g., as illustrated at stage 5 of FIG. 4. At block 708, the positioning session is performed through the wireless network using measured signals from at least the E-UTRAN base station and an NR base station, e.g., as illustrated at stages 8-11 of FIG. 4.

In one implementation, for each E-UTRAN base station to which the UE connects, the UE may further determine whether the base station is capable of EN-DC, e.g., as illustrated at stages 2 and 8 of FIG. 6. The UE may store a list of E-UTRAN base stations capable of EN-DC, e.g., as illustrated at stages 3 and 9 of FIG. 6. The UE may connect to the wireless network using the E-UTRAN base station capable of EN-DC by connecting to one of the E-UTRAN base stations from the list of E-UTRAN base stations capable of EN-DC, e.g., as illustrated at stage 12 of FIG. 6.

In one implementation, for each E-UTRAN base station to which the UE connects, the UE may further determine whether the E-UTRAN base station supports emergency call support over NR, e.g., as illustrated at stages 2 and 8 of FIG. 6. The UE may store a list of E-UTRAN base stations that include emergency call support over NR, e.g., as illustrated at stages 3 and 9 of FIG. 6. Detecting the initiation of the positioning session may comprise detecting an emergency call, e.g., as illustrated in stage 10 of FIG. 6 and the UE may connect the UE to the wireless network using the E-UTRAN base station capable of EN-DC by connecting to one of the E-UTRAN base stations from the list of E-UTRAN base stations that include emergency call support over NR, e.g., as illustrated at stage 12 of FIG. 6.

Figure 8:
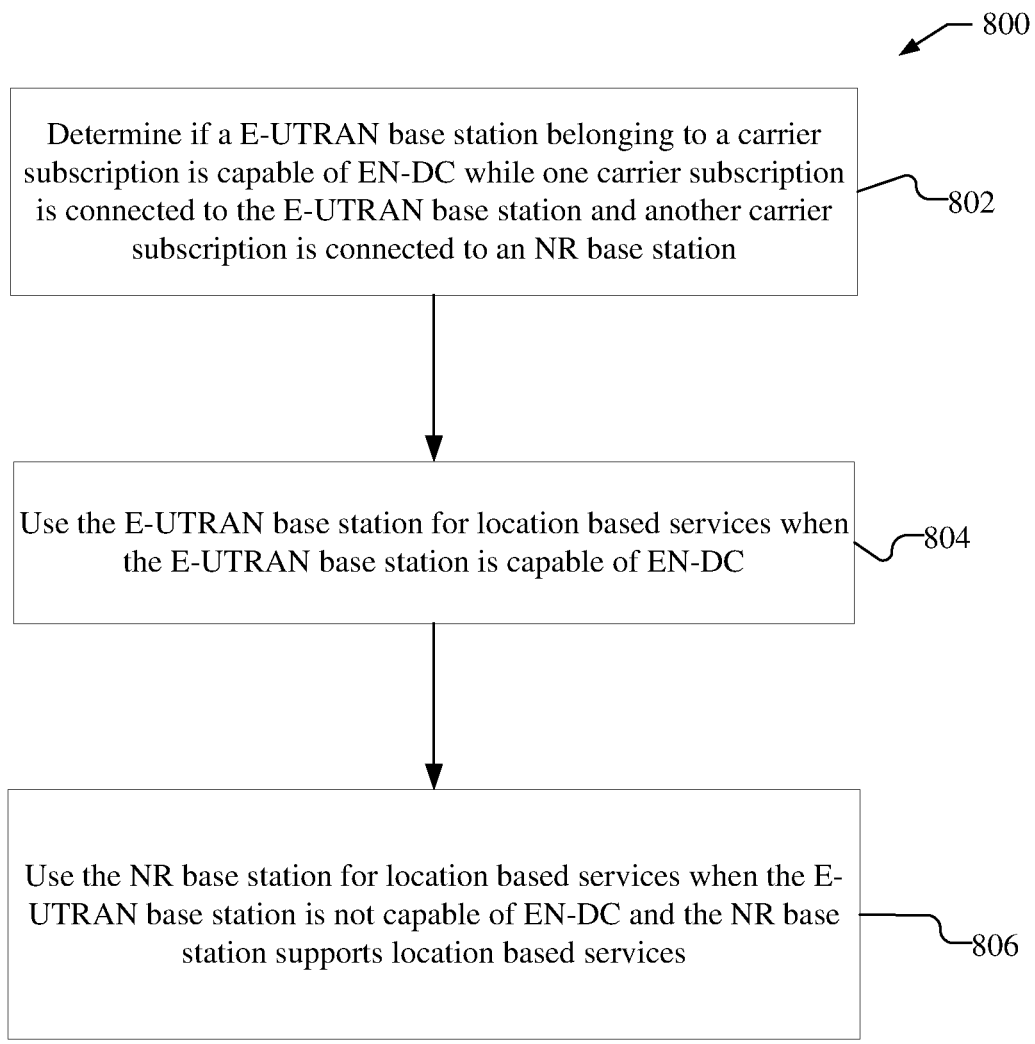
FIG. 8 shows a flowchart of another example procedure for supporting location of a UE.

FIG. 8 shows a flowchart of another example procedure 800 for supporting location of a user equipment (UE) such as the UE 115 in FIGS. 1 and 2, performed by the UE. The UE has multiple carrier subscriptions and supports Evolved Universal Mobile Telecommunications System (UMTS) Terrestrial Radio Access Network (E-UTRAN) New Radio (NR)-Dual connectivity (EN-DC).

At block 802, the UE determines if a E-UTRAN base station belonging to a carrier subscription is capable of EN-DC while one carrier subscription is connected to the E-UTRAN base station and another carrier subscription is connected to an NR base station, e.g., as illustrated at stage 1 of FIGS. 5A and 5B.

At block 804, the UE uses the E-UTRAN base station for location based services when the E-UTRAN base station is capable of EN-DC, e.g., as illustrated at stage 3 of FIG. 5A.

At block 806, the UE uses the NR base station for location based services when the E-UTRAN base station is not capable of EN-DC and the NR base station supports Emergency Over NR (EONR) and location based services, e.g., as illustrated at stage 4 of FIG. 5B.

Figure 9:
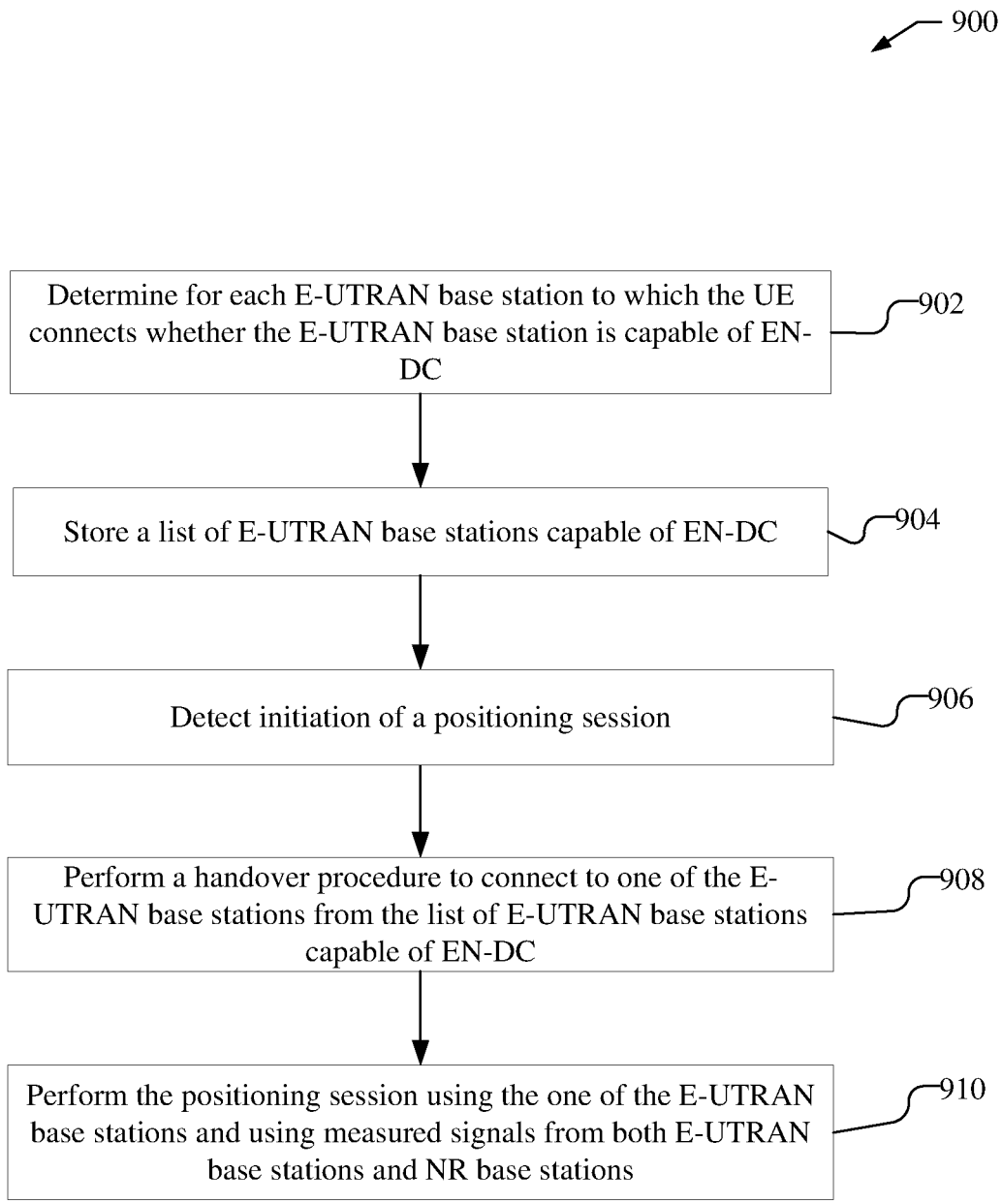
FIG. 9 shows a flowchart of another example procedure for supporting location of a UE.

FIG. 9 shows a flowchart of another example procedure 900 for supporting location of a user equipment (UE) such as the UE 115 in FIGS. 1 and 2, performed by the UE. The UE supports Evolved Universal Mobile Telecommunications System (UMTS) Terrestrial Radio Access Network (E-UTRAN) New Radio (NR)-Dual connectivity (EN-DC).

At block 902, for each E-UTRAN base station to which the UE connects, the UE determines whether the E-UTRAN base station is capable of EN-DC, e.g., as illustrated at stages 2 and 8 of FIG. 6. For example, determining whether the base station is capable of EN-DC may include detecting an indication that the base station is capable of EN-DC in a system block information type 2 (SIB2) information field. For example, the SIB2 information field is an upper layer indication information element.

At block 904, the UE stores a list of E-UTRAN base stations capable of EN-DC, e.g., as illustrated at stages 3 and 9 of FIG. 6. At block 906, the UE detects initiation of a positioning session, e.g., as illustrated at stage 10 of FIG. 6. For example, detecting the initiation of the positioning session may comprise detecting an emergency call or an application that initiates the positioning session, e.g., as illustrated at stage 10 of FIG. 6. At block 908, the UE performs a handover procedure to connect to one of the E-UTRAN base stations from the list of E-UTRAN base stations capable of EN-DC, e.g., as illustrated at stage 12 of FIG. 6. At block 910, the positioning session is performed using the one of the E-UTRAN base stations and using measured signals from the connected E-UTRAN base station and an NR base station, e.g., as illustrated at stages 15-18 of FIG. 6.

In one implementation, for each E-UTRAN base station to which the UE connects, the UE may further determine whether the E-UTRAN base station supports emergency call support over NR, e.g., as illustrated at stages 2 and 8 of FIG. 6. The UE may store a list of E-UTRAN base stations that include emergency call support over NR, e.g., as illustrated at stages 3 and 9 of FIG. 6. Detecting the initiation of the positioning session may comprise detecting an emergency call, as illustrated at stage 10 of FIG. 6, and the UE may perform the handover procedure to connect to the one of the E-UTRAN base stations from the list of E-UTRAN base stations capable of EN-DC and the list of E-UTRAN base stations that include emergency call support over NR, e.g., as illustrated at stage 12 of FIG. 6.

In one implementation, the UE may further prioritize E-UTRAN base stations from the list of E-UTRAN base stations capable of EN-DC during the handover procedure, e.g., as illustrated at stage 11 and 12 of FIG. 6.

Figure 10:
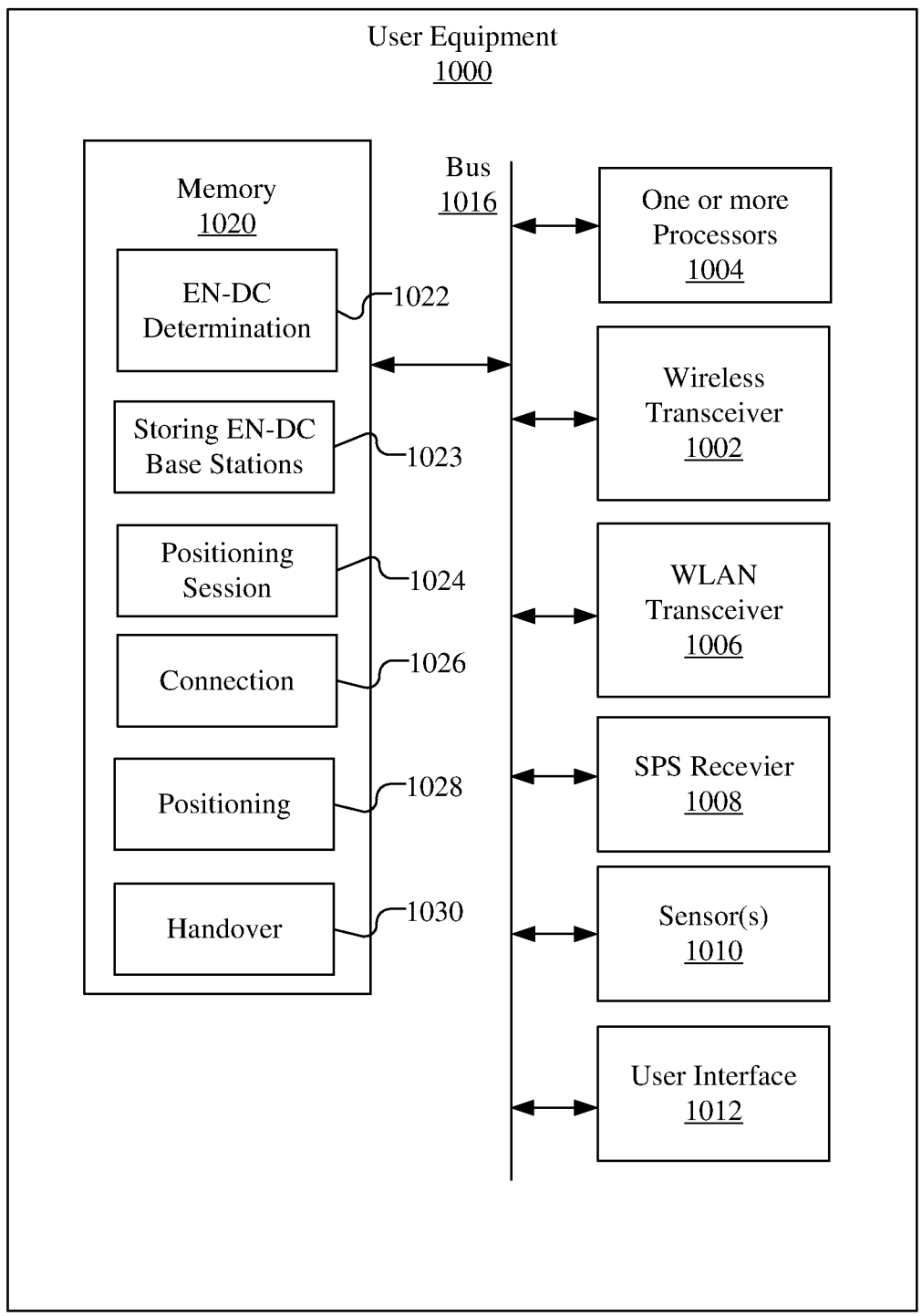
FIG. 10 is a block diagram of an embodiment of UE capable of using EN-DC as described herein.

FIG. 10 is a diagram illustrating an example of a hardware implementation of a user equipment (UE) 1000, such as UE 115. The UE 1000 may be a MSIM or SSIM device capable of EN-DC. The UE 1000 may include a wireless transceiver 1002 to wirelessly communicate with a network entity, e.g., such as base station 105, and capable of receiving positing signals from E-UTRAN base stations and NR base stations. The UE 1000 may also include additional transceivers, such a wireless local area network (WLAN) transceiver 1006, as well as an SPS receiver 1008 for receiving and measuring signals from SPS SVs. The UE 1000 may further include one or more sensors 1010, such as cameras, accelerometers, gyroscopes, electronic compass, magnetometer, barometer, etc. The UE 1000 may further include a user interface 1012 that may include e.g., a display, a keypad or other input device, such as virtual keypad on the display, through which a user may interface with the UE 1000. The UE 1000 further includes one or more processors 1004 and memory 1020, which may be coupled together with bus 1016. The one or more processors 1004 and other components of the UE 1000 may similarly be coupled together with bus 1016, a separate bus, or may be directly connected together or coupled using a combination of the foregoing. The memory 1020 may contain executable code or software instructions that when executed by the one or more processors 1004 cause the one or more processors to operate as a special purpose computer programmed to perform the algorithms disclosed herein, e.g., in FIGS. 7, 8, and 9.

As illustrated in FIG. 10, the memory 1020 may include one or more components or modules that may be implemented by the one or more processors 1004 to perform the methodologies described herein. While the components or modules are illustrated as software in memory 1020 that is executable by the one or more processors 1004, it should be understood that the components or modules may be dedicated hardware either in the one or more processors 1004 or off the processors.

As illustrated, the memory 1020 includes one or more components or modules that when implemented by the one or more processors 1004 implements the methodologies as described herein. While the components or modules are illustrated as software in memory 1020 that is executable by the one or more processors 1004, it should be understood that the components or modules may be dedicated hardware either in the processor or off processor.

As illustrated, the memory 1020 may include an EN-DC determination module 1022 that that enables the one or more processors 1004 to determine whether an E-UTRAN base station is supports EN-DC, e.g., based on an upper layer indication information element in an SIB2 received via the wireless transceiver 1002. The EN-DC determination module 1022 may configured the one or more processors 1004, for example, detect an indication that the E-UTRAN base station is capable of EN-DC in a system block information type 2 (SIB2) information field, which may be an upper layer indication information element. The EN-DC determination module 1022 may be further configured to determine whether an E-UTRAN base station includes emergency call support over NR (EONR). A storing EN-DC base stations module 1023 enables the one or more processors 1004 to store a list of E-UTRAN base stations that are determined to be capable of EN-DC, and in some implementations E-UTRAN base stations that include emergency call support over NR (EONR), e.g., in memory 1020 or in a separate memory. A positioning session module 1024 enables the one or more processors 1004 to detect when a positioning session is initiated. For example, the one or more processors 1004 may be configured to detect when an emergency call is made or when an application is initiated. A connection module 1026 enables the one or more processors 1004 to connect to a wireless network (e.g., when in idle mode) in response to the detection session using an E-UTRAN base station capable of EN-DC. The connection module 1026 may further enable the one or more processors 1004 to connect to a E-UTRAN base station based on the stored list of E-UTRAN base stations. The connection module 1026 may further enable the one or more processors 1004 to use an E-UTRAN base station for location based services when the E-UTRAN base station is capable of EN-DC or to use an NR base station of location based services when an E-UTRAN base station is not capable of EN-DC and the NR base station supports location based services. A positioning module 1028 enables the one or more processors 1004 to perform positioning using measured signals received from at least the E-UTRAN base station and an NR base station. A handover module 1030 enables the one or more processors 1004 to perform a handover procedure, e.g., giving priority to E-UTRAN base stations capable of EN-DC.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1020, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment (UE), such as UE 1000 that is capable of supporting location of the UE and has multiple carrier subscriptions and supports Evolved Universal Mobile Telecommunications System (UMTS) Terrestrial Radio Access Network (E-UTRAN) New Radio (NR)-Dual connectivity (EN-DC), may include means for means for determining an E-UTRAN base station belonging to one of the multiple carrier subscriptions is capable of EN-DC while each of the carrier subscriptions is camped to E-UTRAN base stations and the UE is in idle mode which may be, e.g., the wireless transceiver 1002 and one or more processors 1004 with dedicated hardware or implementing executable code or software instructions in memory 1020 such as the EN-DC determination module 1022. A means for detecting initiation of a positioning session may be, e.g., the wireless transceiver 1002 and one or more processors 1004 with dedicated hardware or implementing executable code or software instructions in memory 1020 such as the positioning session module 1024. A means for connecting the UE to the wireless network using the E-UTRAN base station capable of EN-DC may be, e.g., the wireless transceiver 1002 and one or more processors 1004 with dedicated hardware or implementing executable code or software instructions in memory 1020 such as the connection module 1026. A means for performing the positioning session through the wireless network using measured signals from at least the E-UTRAN base station and an NR base station may be, e.g., the wireless transceiver 1002 and one or more processors 1004 with dedicated hardware or implementing executable code or software instructions in memory 1020 such as the positioning module 1028.

In one implementation, the means for determining the E-UTRAN base station belonging to the one of the carrier subscriptions is capable of EN-DC comprises means for detecting an indication that the E-UTRAN base station belonging to the one of the carrier subscriptions is capable of EN-DC in a system block information type 2 (SIB2) information field, which may be, e.g., the wireless transceiver 1002 and one or more processors 1004 with dedicated hardware or implementing executable code or software instructions in memory 1020 such as the EN-DC determination module 1022.

In one implementation, the means for detecting the initiation of the positioning session comprises means for detecting an emergency call or an application that initiates the positioning session, which may be, e.g., the wireless transceiver 1002 and one or more processors 1004 with dedicated hardware or implementing executable code or software instructions in memory 1020 such as the positioning session module 1024.

In one implementation, the UE may further include a means for determining for each E-UTRAN base station to which the UE connects whether the E-UTRAN base station is capable of EN-DC, which may be, e.g., the wireless transceiver 1002 and one or more processors 1004 with dedicated hardware or implementing executable code or software instructions in memory 1020 such as the EN-DC determination module 1022. A means for storing a list of E-UTRAN base stations capable of EN-DC may be, e.g., the one or more processors 1004 with dedicated hardware or implementing executable code or software instructions in memory 1020 such as the storing EN-DC base stations module 1023. The means for connecting the UE to the wireless network using the E-UTRAN base station capable of EN-DC, connects to one of the E-UTRAN base stations from the list of E-UTRAN base stations capable of EN-DC.

In one implementation, the UE may further include a means for determining for each E-UTRAN base station to which the UE connects whether the E-UTRAN base station supports emergency call support over NR, which may be, e.g., the wireless transceiver 1002 and one or more processors 1004 with dedicated hardware or implementing executable code or software instructions in memory 1020 such as the EN-DC determination module 1022. A means for storing a list of E-UTRAN base stations that include emergency call support over NR may be, e.g., the one or more processors 1004 with dedicated hardware or implementing executable code or software instructions in memory 1020 such as the storing EN-DC base stations module 1023. The means for detecting the initiation of the positioning session comprises means for detecting an emergency call, which may be, e.g., the wireless transceiver 1002 and one or more processors 1004 with dedicated hardware or implementing executable code or software instructions in memory 1020 such as the positioning session module 1024. The means for connecting the UE to the wireless network using the E-UTRAN base station capable of EN-DC DC connects to one of the E-UTRAN base stations from the list of E-UTRAN base stations that include emergency call support over NR.

The UE may include a means for determining if a E-UTRAN base station belonging to a carrier subscription is capable of EN-DC while one carrier subscription is connected to the E-UTRAN base station and another carrier subscription is connected to an NR base station, which may be, e.g., the wireless transceiver 1002 and one or more processors 1004 with dedicated hardware or implementing executable code or software instructions in memory 1020 such as the EN-DC determination module 1022. A means for using the E-UTRAN base station for location based services when the E-UTRAN base station is capable of EN-DC may be, e.g., the wireless transceiver 1002 and one or more processors 1004 with dedicated hardware or implementing executable code or software instructions in memory 1020 such as the positioning module 1028. A means for using the NR base station for location based services when the E-UTRAN base station is not capable of EN-DC and the NR base station supports location based services may be, e.g., the wireless transceiver 1002 and one or more processors 1004 with dedicated hardware or implementing executable code or software instructions in memory 1020 such as the positioning module 1028.

In one implementation, the means for determining if the E-UTRAN base station belonging to the carrier subscriptions is capable of EN-DC comprises means for detecting an indication that the E-UTRAN base station belonging to the one of the carrier subscriptions is capable of EN-DC in a system block information type 2 (SIB2) information field, which may be, e.g., the wireless transceiver 1002 and one or more processors 1004 with dedicated hardware or implementing executable code or software instructions in memory 1020 such as the EN-DC determination module 1022.

The UE may include a means for determining for each E-UTRAN base station to which the UE connects whether the E-UTRAN base station is capable of EN-DC, which may be, e.g., the wireless transceiver 1002 and one or more processors 1004 with dedicated hardware or implementing executable code or software instructions in memory 1020 such as the EN-DC determination module 1022. A means for storing a list of E-UTRAN base stations capable of EN-DC may be, e.g., the one or more processors 1004 with dedicated hardware or implementing executable code or software instructions in memory 1020 such as the storing EN-DC base stations module 1023. A means for connecting to an E-UTRAN base station that is not capable of EN-DC may be, e.g., the one or more processors 1004 with dedicated hardware or implementing executable code or software instructions in memory 1020 such as the connection module 1026. A means for detecting initiation of a positioning session may be, e.g., the wireless transceiver 1002 and one or more processors 1004 with dedicated hardware or implementing executable code or software instructions in memory 1020 such as the positioning session module 1024. A means for performing a handover procedure to connect to one of the E-UTRAN base stations from the list of E-UTRAN base stations capable of EN-DC may be, e.g., the wireless transceiver 1002 and one or more processors 1004 with dedicated hardware or implementing executable code or software instructions in memory 1020 such as the handover module 1030. A means for performing the positioning session using the one of the E-UTRAN base stations and using measured signals from at least the connected E-UTRAN base stations and an NR base station may be, e.g., the wireless transceiver 1002 and one or more processors 1004 with dedicated hardware or implementing executable code or software instructions in memory 1020 such as the positioning module 1028.

In one implementation, the means for determining for each E-UTRAN base station that the UE connects to whether the E-UTRAN base station is capable of EN-DC comprises means for detecting an indication that the E-UTRAN base station is capable of EN-DC in a system block information type 2 (SIB2) information field, which may be, e.g., the wireless transceiver 1002 and one or more processors 1004 with dedicated hardware or implementing executable code or software instructions in memory 1020 such as the EN-DC determination module 1022.

In one implementation, the means for detecting the initiation of the positioning session comprises means for detecting an emergency call or an application that initiates the positioning session, which may be, e.g., the wireless transceiver 1002 and one or more processors 1004 with dedicated hardware or implementing executable code or software instructions in memory 1020 such as the positioning session module 1024.

In one implementation, the UE may further include a means prioritizing E-UTRAN base stations from the list of E-UTRAN base stations capable of EN-DC during the handover procedure, which may be, e.g., the wireless transceiver 1002 and one or more processors 1004 with dedicated hardware or implementing executable code or software instructions in memory 1020 such as the handover module 1030.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method for supporting location of a user equipment (UE) in a wireless network, the method performed by the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the method comprising:

determining an E-UTRAN base station belonging to one of the multiple carrier subscriptions is capable of EN-DC while each of the carrier subscriptions is camped to E-UTRAN base stations and the UE is in idle mode;

detecting initiation of a positioning session;

connecting the UE to the wireless network using the E-UTRAN base station capable of EN-DC; and performing the positioning session through the wireless network using measured signals from at least the E-UTRAN base station and an NR base station.

2. The method of clause 1, wherein determining the E-UTRAN base station belonging to the one of the carrier subscriptions is capable of EN-DC comprises detecting an indication that the E-UTRAN base station belonging to the one of the carrier subscriptions is capable of EN-DC in a system block information type 2 (SIB2) information field.

3. The method of clause 2, wherein the SIB2 information field is an upper layer indication information element.

4. The method of any of clauses 1-3, wherein detecting the initiation of the positioning session comprises detecting an emergency call or an application that initiates the positioning session.

5. The method of any of clauses 1-4, further comprising:
determining for each E-UTRAN base station to which the UE connects whether the E-UTRAN base station is capable of EN-DC; and
storing a list of E-UTRAN base stations capable of EN-DC;
wherein connecting the UE to the wireless network using the E-UTRAN base station capable of EN-DC comprises connecting to one of the E-UTRAN base stations from the list of E-UTRAN base stations capable of EN-DC.

6. The method of any of clauses 1-5, further comprising:
determining for each E-UTRAN base station to which the UE connects whether the E-UTRAN base station supports emergency call support over NR; and
storing a list of E-UTRAN base stations that include emergency call support over NR;
wherein detecting the initiation of the positioning session comprises detecting an emergency call and wherein connecting the UE to the wireless network using the E-UTRAN base station capable of EN-DC comprises connecting to one of the E-UTRAN base stations from the list of E-UTRAN base stations that include emergency call support over NR.

7. A user equipment (UE) in a wireless network capable of supporting positioning of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE comprising:
a wireless transceiver capable of communicating with E-UTRAN base stations and NR base stations;
at least one memory; and
at least one processor coupled to the wireless transceiver and the at least one memory, the at least one processor configured to:
determine an E-UTRAN base station belonging to one of the multiple carrier subscriptions is capable of EN-DC while each of the carrier subscriptions is camped to E-UTRAN base stations and the UE is in idle mode;
detect initiation of a positioning session;
connect the UE via the wireless transceiver to the wireless network using the E-UTRAN base station capable of EN-DC; and
perform the positioning session through the wireless network using measured signals from at least the E-UTRAN base station and an NR base station.

8. The UE of clause 7, wherein the at least one processor is configured to determine the E-UTRAN base station belonging to the one of the carrier subscriptions is capable of EN-DC by being configured to detect an indication that the E-UTRAN base station belonging to the one of the carrier subscriptions is capable of EN-DC in a system block information type 2 (SIB2) information field.

9. The UE of clause 8, wherein the SIB2 information field is an upper layer indication information element.

10. The UE of any of clauses 7-9, wherein the at least one processor is configured to detect the initiation of the positioning session by being configured to detect an emergency call or an application that initiates the positioning session.

11. The UE of any of clauses 7-10, wherein the at least one processor is further configured to:
determine for each E-UTRAN base station to which the UE connects whether the E-UTRAN base station is capable of EN-DC; and
store a list of E-UTRAN base stations capable of EN-DC;
wherein the at least one processor is configured to connect the UE to the wireless network using the E-UTRAN base station capable of EN-DC by being configured to connect to one of the E-UTRAN base stations from the list of E-UTRAN base stations capable of EN-DC.

12. The UE of any of clauses 7-11, wherein the at least one processor is further configured to:
determine for each E-UTRAN base station to which the UE connects whether the E-UTRAN base station supports emergency call support over NR; and
store a list of E-UTRAN base stations that include emergency call support over NR;
wherein the at least one processor is configured to detect the initiation of the positioning session by being configured to detect an emergency call and wherein the at least one processor is configured to connect the UE to the wireless network using the E-UTRAN base station capable of EN-DC by being configured to connect to one of the E-UTRAN base stations from the list of E-UTRAN base stations that include emergency call support over NR.

13. A user equipment (UE) in a wireless network capable of supporting location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE comprising:
means for determining an E-UTRAN base station belonging to one of the multiple carrier subscriptions is capable of EN-DC while each of the carrier subscriptions is camped to E-UTRAN base stations and the UE is in idle mode;
means for detecting initiation of a positioning session;
means for connecting the UE to the wireless network using the E-UTRAN base station capable of EN-DC; and
means for performing the positioning session through the wireless network using measured signals from at least the E-UTRAN base station and an NR base station.

14. The UE of clause 13, wherein the means for determining the E-UTRAN base station belonging to the one of the carrier subscriptions is capable of EN-DC comprises means for detecting an indication that the E-UTRAN base station belonging to the one of the carrier subscriptions is capable of EN-DC in a system block information type 2 (SIB2) information field.

15. The UE of clause 14, wherein the SIB2 information field is an upper layer indication information element.

16. The UE of any of clauses 13-15, wherein the means for detecting the initiation of the positioning session comprises means for detecting an emergency call or an application that initiates the positioning session.

17. The UE of any of clauses 13-16, further comprising:
means for determining for each E-UTRAN base station to which the UE connects whether the E-UTRAN base station is capable of EN-DC; and
means for storing a list of E-UTRAN base stations capable of EN-DC;

wherein the means for connecting the UE to the wireless network using the E-UTRAN base station capable of EN-DC connects to one of the E-UTRAN base stations from the list of E-UTRAN base stations capable of EN-DC.

18. The UE of any of clauses 13-17, further comprising:
means for determining for each E-UTRAN base station to which the UE connects whether the E-UTRAN base station supports emergency call support over NR; and
means for storing a list of E-UTRAN base stations that include emergency call support over NR;
wherein the means for detecting the initiation of the positioning session comprises means for detecting an emergency call and wherein the means for connecting the UE to the wireless network using the E-UTRAN base station capable of EN-DC connects to one of the E-UTRAN base stations from the list of E-UTRAN base stations that include emergency call support over NR.

19. A non-transitory storage medium including program code stored thereon, the program code is operable to configure at least one processor in a user equipment (UE) in a wireless network to support location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the non-transitory storage medium comprising:
program code to determine an E-UTRAN base station belonging to one of the multiple carrier subscriptions is capable of EN-DC while each of the carrier subscriptions is camped to E-UTRAN base stations and the UE is in idle mode;
program code to detect initiation of a positioning session;
program code to connect the UE to the wireless network using the E-UTRAN base station capable of EN-DC; and
program code to perform the positioning session through the wireless network using measured signals from at least the E-UTRAN base station and an NR base station.

20. The non-transitory storage medium of clause 19, wherein the program code to determine the E-UTRAN base station belonging to the one of the carrier subscriptions is capable of EN-DC comprises program code to detect an indication that the E-UTRAN base station belonging to the one of the carrier subscriptions is capable of EN-DC in a system block information type 2 (SIB2) information field.

21. The non-transitory storage medium of clause 20, wherein the SIB2 information field is an upper layer indication information element.

22. The non-transitory storage medium of any of clauses 19-21, wherein the program code to detect the initiation of the positioning session comprises program code to detect an emergency call or an application that initiates the positioning session.

23. The non-transitory storage medium of any of clauses 19-22, further comprising:
program code to determine for each E-UTRAN base station to which the UE connects whether the E-UTRAN base station is capable of EN-DC; and
program code to store a list of E-UTRAN base stations capable of EN-DC;
wherein the program code to connect the UE to the wireless network using the E-UTRAN base station capable of EN-DC comprises program code to connect to one of the E-UTRAN base stations from the list of E-UTRAN base stations capable of EN-DC.

24. The non-transitory storage medium of any of clauses 19-23, further comprising:
program code to determine for each E-UTRAN base station to which the UE connects whether the E-UTRAN base station supports emergency call support over NR; and
program code to store a list of E-UTRAN base stations that include emergency call support over NR;
wherein the program code to detect the initiation of the positioning session comprises program code to detect an emergency call and wherein the program code to connect the UE to the wireless network using the E-UTRAN base station capable of EN-DC comprises program code to connect to one of the E-UTRAN base stations from the list of E-UTRAN base stations that include emergency call support over NR.

25. A method for supporting location of a user equipment (UE) in a wireless network, the method performed by the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the method comprising:
determining if a E-UTRAN base station belonging to a carrier subscription is capable of EN-DC while one carrier subscription is connected to the E-UTRAN base station and another carrier subscription is connected to an NR base station;
using the E-UTRAN base station for location based services when the E-UTRAN base station is capable of EN-DC; and
using the NR base station for location based services when the E-UTRAN base station is not capable of EN-DC and the NR base station supports location based services.

26. The method of clause 25, wherein determining if the E-UTRAN base station belonging to the carrier subscriptions is capable of EN-DC comprises detecting an indication that the E-UTRAN base station belonging to the carrier subscriptions is capable of EN-DC in a system block information type 2 (SIB2) information field.

27. The method of clause 26, wherein the SIB2 information field is an upper layer indication information element.

28. A user equipment (UE) in a wireless network capable of supporting positioning of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE comprising:
a wireless transceiver capable of communicating with E-UTRAN base stations and NR base stations;
at least one memory; and
at least one processor coupled to the wireless transceiver and the at least one memory, the at least one processor configured to:
determine if a E-UTRAN base station belonging to a carrier subscription is capable of EN-DC while one carrier subscription is connected to the E-UTRAN base station and another carrier subscription is connected to an NR base station;
use the E-UTRAN base station for location based services when the E-UTRAN base station is capable of EN-DC; and
use the NR base station for location based services when the E-UTRAN base station is not capable of EN-DC and the NR base station supports location based services.

29. The UE of clause 28, wherein the at least one processor is configured to determine if the E-UTRAN base station belonging to the carrier subscriptions is capable of EN-DC by being configured to detect an indication that the E-UTRAN base station belonging to the carrier subscriptions is capable of EN-DC in a system block information type 2 (SIB2) information field.

30. The UE of clause 29, wherein the SIB2 information field is an upper layer indication information element.

31. A user equipment (UE) in a wireless network capable of supporting location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the UE comprising:

means for determining if a E-UTRAN base station belonging to a carrier subscription is capable of EN-DC while one carrier subscription is connected to the E-UTRAN base station and another carrier subscription is connected to an NR base station;

means for using the E-UTRAN base station for location based services when the E-UTRAN base station is capable of EN-DC; and means for using the NR base station for location based services when the E-UTRAN base station is not capable of EN-DC and the NR base station supports location based services.

32. The UE of clause 31, wherein the means for determining if the E-UTRAN base station belonging to the carrier subscriptions is capable of EN-DC comprises means for detecting an indication that the E-UTRAN base station belonging to the carrier subscriptions is capable of EN-DC in a system block information type 2 (SIB2) information field.

33. The UE of clause 32, wherein the SIB2 information field is an upper layer indication information element.

34. A non-transitory storage medium including program code stored thereon, the program code is operable to configure at least one processor in a user equipment (UE) in a wireless network to support location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the non-transitory storage medium comprising:

program code to determine if a E-UTRAN base station belonging to a carrier subscription is capable of EN-DC while one carrier subscription is connected to the E-UTRAN base station and another carrier subscription is connected to an NR base station;

program code to use the E-UTRAN base station for location based services when the E-UTRAN base station is capable of EN-DC; and program code to use the NR base station for location based services when the E-UTRAN base station is not capable of EN-DC and the NR base station supports location based services.

35. The non-transitory storage medium of clause 34, wherein the program code to determine if the E-UTRAN base station belonging to the carrier subscriptions is capable of EN-DC comprises program code to detect an indication that the E-UTRAN base station belonging to the carrier subscriptions is capable of EN-DC in a system block information type 2 (SIB2) information field.

36. The non-transitory storage medium of clause 35, wherein the SIB2 information field is an upper layer indication information element.

37. A method for supporting location of a user equipment (UE) in a wireless network, the method performed by the UE, wherein the UE supports Evolved Universal Mobile Telecommunications System (UMTS) Terrestrial Radio Access Network (E-UTRAN) New Radio (NR)-Dual connectivity (EN-DC), the method comprising:

determining for each E-UTRAN base station to which the UE connects whether the E-UTRAN base station is capable of EN-DC;

storing a list of E-UTRAN base stations capable of EN-DC;

connecting to an E-UTRAN base station that is not capable of EN-DC;

detecting initiation of a positioning session;

performing a handover procedure to connect to one of the E-UTRAN base stations from the list of E-UTRAN base stations capable of EN-DC; and performing the positioning session using the one of the E-UTRAN base stations and using measured signals from at least the connected E-UTRAN base stations and an NR base station.

38. The method of clause 37, further comprising:

determining for each E-UTRAN base station to which the UE connects whether the E-UTRAN base station supports emergency call support over NR; and storing a list of E-UTRAN base stations that include emergency call support over NR;

wherein detecting the initiation of the positioning session comprises detecting an emergency call and wherein performing the handover procedure connects to the one of the E-UTRAN base stations from the list of E-UTRAN base stations capable of EN-DC and the list of E-UTRAN base stations that include emergency call support over NR.

39. The method of any of clauses 37-38, wherein determining for each E-UTRAN base station that the UE connects to whether the E-UTRAN base station is capable of EN-DC comprises detecting an indication that the E-UTRAN base station is capable of EN-DC in a system block information type 2 (SIB2) information field.

40. The method of clause 39, wherein the SIB2 information field is an upper layer indication information element.

41. The method of any of clauses 37-40, wherein detecting the initiation of the positioning session comprises detecting an emergency call or an application that initiates the positioning session.

42. The method of any of clauses 37-41, further comprising prioritizing E-UTRAN base stations from the list of E-UTRAN base stations capable of EN-DC during the handover procedure.

43. A user equipment (UE) in a wireless network capable of supporting positioning of the UE, wherein the UE supports Evolved Universal Mobile Telecommunications System (UMTS) Terrestrial Radio Access Network (E-UTRAN) New Radio (NR)-Dual connectivity (EN-DC), the UE comprising:

a wireless transceiver capable of communicating with E-UTRAN base stations and NR base stations;

at least one memory; and at least one processor coupled to the wireless transceiver and the at least one memory, the at least one processor configured to:

determine for each E-UTRAN base station to which the UE connects whether the E-UTRAN base station is capable of EN-DC;

store a list of E-UTRAN base stations capable of EN-DC;

connect to an E-UTRAN base station that is not capable of EN-DC;

detect initiation of a positioning session;
performing a handover procedure to connect via the wireless transceiver to one of the E-UTRAN base stations from the list of E-UTRAN base stations capable of EN-DC; and perform the positioning session using the one of the E-UTRAN base stations and using measured signals from at least the connected E-UTRAN base stations and an NR base station.

44. The UE of clause 43, wherein the at least one processor is further configured to:

determine for each E-UTRAN base station to which the UE connects whether the E-UTRAN base station supports emergency call support over NR; and store a list of E-UTRAN base stations that include emergency call support over NR;

wherein the at least one processor is configured to detect the initiation of the positioning session by being configured to detect an emergency call and wherein the at least one processor is configured to perform the handover procedure to connect to the one of the E-UTRAN base stations from the list of E-UTRAN base stations capable of EN-DC and the list of E-UTRAN base stations that include emergency call support over NR.

45. The UE of any of clauses 43-44, wherein the at least one processor is configured to determine for each E-UTRAN base station that the UE connects to whether the E-UTRAN base station is capable of EN-DC by being configured to detect an indication that the E-UTRAN base station is capable of EN-DC in a system block information type 2 (SIB2) information field.

46. The UE of clause 45, wherein the SIB2 information field is an upper layer indication information element.

47. The UE of any of clauses 43-46, wherein the at least one processor is configured to detect the initiation of the positioning session by being configured to detect an emergency call or an application that initiates the positioning session.

48. The UE of any of clauses 43-47, the at least one processor is configured further configured to prioritize E-UTRAN base stations from the list of E-UTRAN base stations capable of EN-DC during the handover procedure.

49. A user equipment (UE) in a wireless network capable of supporting location of the UE, wherein the UE supports Evolved Universal Mobile Telecommunications System (UMTS) Terrestrial Radio Access Network (E-UTRAN) New Radio (NR)-Dual connectivity (EN-DC), the UE comprising:

means for determining for each E-UTRAN base station to which the UE connects whether the E-UTRAN base station is capable of EN-DC;

means for storing a list of E-UTRAN base stations capable of EN-DC;

means for connecting to an E-UTRAN base station that is not capable of EN-DC;

means for detecting initiation of a positioning session;

means for performing a handover procedure to connect to one of the E-UTRAN base stations from the list of E-UTRAN base stations capable of EN-DC; and means for performing the positioning session using the one of the E-UTRAN base stations and using measured signals from at least the connected E-UTRAN base stations and an NR base station.

50. The UE of clause 49, further comprising:

means for determining for each E-UTRAN base station to which the UE connects whether the E-UTRAN base station supports emergency call support over NR; and means for storing a list of E-UTRAN base stations that include emergency call support over NR;

wherein the means for detecting the initiation of the positioning session comprises means for detecting an emergency call and wherein the means for performing the handover procedure connects to the one of the E-UTRAN base stations from the list of E-UTRAN base stations capable of EN-DC and the list of E-UTRAN base stations that include emergency call support over NR.

51. The UE of any of clauses 49-50, wherein the means for determining for each E-UTRAN base station that the UE connects to whether the E-UTRAN base station is capable of EN-DC comprises means for detecting an indication that the E-UTRAN base station is capable of EN-DC in a system block information type 2 (SIB2) information field.

52. The UE of clause 51, wherein the SIB2 information field is an upper layer indication information element.

53. The UE of any of clauses 49-52, wherein the means for detecting the initiation of the positioning session comprises means for detecting an emergency call or an application that initiates the positioning session.

54. The UE of any of clauses 49-53, further comprising means for prioritizing E-UTRAN base stations from the list of E-UTRAN base stations capable of EN-DC during the handover procedure.

55. A non-transitory storage medium including program code stored thereon, the program code is operable to configure at least one processor in a user equipment (UE) in a wireless network to support location of the UE, wherein the UE supports Evolved Universal Mobile Telecommunications System (UMTS) Terrestrial Radio Access Network (E-UTRAN) New Radio (NR)-Dual connectivity (EN-DC), the non-transitory storage medium comprising:

program code to determine for each E-UTRAN base station to which the UE connects whether the E-UTRAN base station is capable of EN-DC;

program code to store a list of E-UTRAN base stations capable of EN-DC;

program code to connect to an E-UTRAN base station that is not capable of EN-DC;

program code to detect initiation of a positioning session;

program code to perform a handover procedure to connect to one of the E-UTRAN base stations from the list of E-UTRAN base stations capable of EN-DC; and program code to perform the positioning session using the one of the E-UTRAN base stations and using measured signals from at least the connected E-UTRAN base stations and an NR base station.

56. The non-transitory storage medium of clause 55, further comprising:

program code to determine for each E-UTRAN base station to which the UE connects whether the E-UTRAN base station supports emergency call support over NR; and program code to store a list of E-UTRAN base stations that include emergency call support over NR;

wherein the program code to detect the initiation of the positioning session comprises program code to detect an emergency call and wherein the program code to perform the handover procedure connects to the one of the E-UTRAN base stations from the list of E-UTRAN base stations capable of EN-DC and the list of E-UTRAN base stations that include emergency call support over NR.

57. The non-transitory storage medium of any of clauses 55-56, wherein the program code to determine for each E-UTRAN base station that the UE connects to whether the E-UTRAN base station is capable of EN-DC comprises program code to detect an indication that the E-UTRAN base station is capable of EN-DC in a system block information type 2 (SIB2) information field.

58. The non-transitory storage medium of clause 57, wherein the SIB2 information field is an upper layer indication information element.

59. The non-transitory storage medium of any of clauses 55-58, wherein the program code to detect the initiation of the positioning session comprises program code to detect an emergency call or an application that initiates the positioning session.

60. The non-transitory storage medium of any of clauses 55-59, further comprising program code to prioritize E-UTRAN base stations from the list of E-UTRAN base stations capable of EN-DC during the handover procedure.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting location of a user equipment (UE) in a wireless network, the method performed by the UE, wherein the UE has multiple carrier subscriptions and supports Evolved Universal Mobile Telecommunications System (UMTS) Terrestrial Radio Access Network (E-UTRAN) New Radio(NR)-Dual connectivity (EN-DC), the method comprising:
    determining an E-UTRAN base station belonging to one of the multiple carrier subscriptions is capable of EN-DC while each of the carrier subscriptions is camped to E-UTRAN base stations and the UE is in idle mode;
    detecting initiation of a positioning session;
    connecting the UE to the wireless network using the E-UTRAN base station capable of EN-DC; and
    performing the positioning session through the wireless network using measured signals from at least the E-UTRAN base station and an NR base station.

2. The method of claim 1, wherein determining the E-UTRAN base station belonging to the one of the carrier subscriptions is capable of EN-DC comprises detecting an indication that the E-UTRAN base station belonging to the one of the carrier subscriptions is capable of EN-DC in a system block information type 2 (SIB2) information field.

3. The method of claim 2, wherein the SIB2 information field is an upper layer indication information element.

4. The method of claim 1, wherein detecting the initiation of the positioning session comprises detecting an emergency call or an application that initiates the positioning session.

5. The method of claim 1, further comprising:
    determining for each E-UTRAN base station to which the UE connects whether the E-UTRAN base station is capable of EN-DC; and
    storing a list of E-UTRAN base stations capable of EN-DC;
    wherein connecting the UE to the wireless network using the E-UTRAN base station capable of EN-DC comprises connecting to one of the E-UTRAN base stations from the list of E-UTRAN base stations capable of EN-DC.

6. The method of claim 1, further comprising:
    determining for each E-UTRAN base station to which the UE connects whether the E-UTRAN base station supports emergency call support over NR; and
    storing a list of E-UTRAN base stations that include emergency call support over NR;
    wherein detecting the initiation of the positioning session comprises detecting an emergency call and wherein connecting the UE to the wireless network using the E-UTRAN base station capable of EN-DC comprises connecting to one of the E-UTRAN base stations from the list of E-UTRAN base stations that include emergency call support over NR.

7. A user equipment (UE) in a wireless network capable of supporting positioning of the UE, wherein the UE has multiple carrier subscriptions and supports Evolved Universal Mobile Telecommunications System (UMTS) Terrestrial Radio Access Network (E-UTRAN) New Radio(NR)-Dual connectivity (EN-DC), the UE comprising:
    a wireless transceiver capable of communicating with E-UTRAN base stations and NR base stations;
    at least one memory; and
    at least one processor coupled to the wireless transceiver and the at least one memory, the at least one processor configured to:
    determine an E-UTRAN base station belonging to one of the multiple carrier subscriptions is capable of EN-DC while each of the carrier subscriptions is camped to E-UTRAN base stations and the UE is in idle mode;
    detect initiation of a positioning session;
    connect the UE via the wireless transceiver to the wireless network using the E-UTRAN base station capable of EN-DC; and
    perform the positioning session through the wireless network using measured signals from at least the E-UTRAN base station and an NR base station.

8. The UE of claim 7, wherein the at least one processor is configured to determine the E-UTRAN base station belonging to the one of the carrier subscriptions is capable of EN-DC by being configured to detect an indication that the E-UTRAN base station belonging to the one of the carrier subscriptions is capable of EN-DC in a system block information type 2 (SIB2) information field.

9. The UE of claim 8, wherein the SIB2 information field is an upper layer indication information element.

10. The UE of claim 7, wherein the at least one processor is configured to detect the initiation of the positioning session by being configured to detect an emergency call or an application that initiates the positioning session.

11. The UE of claim 7, wherein the at least one processor is further configured to:
    determine for each E-UTRAN base station to which the UE connects whether the E-UTRAN base station is capable of EN-DC; and
    store a list of E-UTRAN base stations capable of EN-DC;
    wherein the at least one processor is configured to connect the UE to the wireless network using the E-UTRAN base station capable of EN-DC by being configured to connect to one of the E-UTRAN base stations from the list of E-UTRAN base stations capable of EN-DC.

12. The UE of claim 7, wherein the at least one processor is further configured to:
 determine for each E-UTRAN base station to which the UE connects whether the E-UTRAN base station supports emergency call support over NR; and
 store a list of E-UTRAN base stations that include emergency call support over NR;
 wherein the at least one processor is configured to detect the initiation of the positioning session by being configured to detect an emergency call and wherein the at least one processor is configured to connect the UE to the wireless network using the E-UTRAN base station capable of EN-DC by being configured to connect to one of the E-UTRAN base stations from the list of E-UTRAN base stations that include emergency call support over NR.

13. A user equipment (UE) in a wireless network capable of supporting location of the UE, wherein the UE has multiple carrier subscriptions and supports Evolved Universal Mobile Telecommunications System (UMTS) Terrestrial Radio Access Network (E-UTRAN) New Radio(NR)-Dual connectivity (EN-DC), the UE comprising:
 means for determining an E-UTRAN base station belonging to one of the multiple carrier subscriptions is capable of EN-DC while each of the carrier subscriptions is camped to E-UTRAN base stations and the UE is in idle mode;
 means for detecting initiation of a positioning session;
 means for connecting the UE to the wireless network using the E-UTRAN base station capable of EN-DC; and
 means for performing the positioning session through the wireless network using measured signals from at least the E-UTRAN base station and an NR base station.

14. The UE of claim 13, wherein the means for determining the E-UTRAN base station belonging to the one of the carrier subscriptions is capable of EN-DC comprises means for detecting an indication that the E-UTRAN base station belonging to the one of the carrier subscriptions is capable of EN-DC in a system block information type 2 (SIB2) information field.

15. The UE of claim 14, wherein the SIB2 information field is an upper layer indication information element.

16. The UE of claim 13, wherein the means for detecting the initiation of the positioning session comprises means for detecting an emergency call or an application that initiates the positioning session.

17. The UE of claim 13, further comprising:
 means for determining for each E-UTRAN base station to which the UE connects whether the E-UTRAN base station is capable of EN-DC; and
 means for storing a list of E-UTRAN base stations capable of EN-DC;
 wherein the means for connecting the UE to the wireless network using the E-UTRAN base station capable of EN-DC connects to one of the E-UTRAN base stations from the list of E-UTRAN base stations capable of EN-DC.

18. The UE of claim 13, further comprising:
 means for determining for each E-UTRAN base station to which the UE connects whether the E-UTRAN base station supports emergency call support over NR; and
 means for storing a list of E-UTRAN base stations that include emergency call support over NR;
 wherein the means for detecting the initiation of the positioning session comprises means for detecting an emergency call and wherein the means for connecting the UE to the wireless network using the E-UTRAN base station capable of EN-DC connects to one of the E-UTRAN base stations from the list of E-UTRAN base stations that include emergency call support over NR.

19. A non-transitory storage medium including program code stored thereon, the program code is operable to configure at least one processor in a user equipment (UE) in a wireless network to support location of the UE, wherein the UE has multiple carrier subscriptions and supports Evolved Universal Mobile Telecommunications System (UMTS) Terrestrial Radio Access Network (E-UTRAN) New Radio (NR)-Dual connectivity (EN-DC), the non-transitory storage medium comprising:
 program code to determine an E-UTRAN base station belonging to one of the multiple carrier subscriptions is capable of EN-DC while each of the carrier subscriptions is camped to E-UTRAN base stations and the UE is in idle mode;
 program code to detect initiation of a positioning session;
 program code to connect the UE to the wireless network using the E-UTRAN base station capable of EN-DC; and
 program code to perform the positioning session through the wireless network using measured signals from at least the E-UTRAN base station and an NR base station.

20. The non-transitory storage medium of claim 19, wherein the program code to determine the E-UTRAN base station belonging to the one of the carrier subscriptions is capable of EN-DC comprises program code to detect an indication that the E-UTRAN base station belonging to the one of the carrier subscriptions is capable of EN-DC in a system block information type 2 (SIB2) information field.

21. The non-transitory storage medium of claim 20, wherein the SIB2 information field is an upper layer indication information element.

22. The non-transitory storage medium of claim 19, wherein the program code to detect the initiation of the positioning session comprises program code to detect an emergency call or an application that initiates the positioning session.

23. The non-transitory storage medium of claim 19, further comprising:
 program code to determine for each E-UTRAN base station to which the UE connects whether the E-UTRAN base station is capable of EN-DC; and
 program code to store a list of E-UTRAN base stations capable of EN-DC;
 wherein the program code to connect the UE to the wireless network using the E-UTRAN base station capable of EN-DC comprises program code to connect to one of the E-UTRAN base stations from the list of E-UTRAN base stations capable of EN-DC.

24. The non-transitory storage medium of claim 19, further comprising:
 program code to determine for each E-UTRAN base station to which the UE connects whether the E-UTRAN base station supports emergency call support over NR; and
 program code to store a list of E-UTRAN base stations that include emergency call support over NR;
 wherein the program code to detect the initiation of the positioning session comprises program code to detect an emergency call and wherein the program code to connect the UE to the wireless network using the E-UTRAN base station capable of EN-DC comprises program code to connect to one of the E-UTRAN base stations from the list of E-UTRAN base stations that include emergency call support over NR.

\* \* \* \* \*